United States Patent
Greszczuk et al.

(10) Patent No.: US 9,521,003 B2
(45) Date of Patent: *Dec. 13, 2016

(54) MULTICARRIER TRANSMISSION SYSTEM WITH LOW POWER SLEEP MODE AND RAPID-ON CAPABILITY

(71) Applicant: TQ DELTA, LLC, Austin, TX (US)

(72) Inventors: John A. Greszczuk, Stow, MA (US); Richard W. Gross, Acton, MA (US); Halil Padir, Lexington, MA (US); Michael A. Tzannes, Lexington, MA (US)

(73) Assignee: TQ DELTA, LLC, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/798,014

(22) Filed: Jul. 13, 2015

(65) Prior Publication Data

US 2015/0326404 A1 Nov. 12, 2015

Related U.S. Application Data

(63) Continuation of application No. 14/295,981, filed on Jun. 4, 2014, now Pat. No. 9,094,268, which is a (Continued)

(51) Int. Cl.
*H04L 5/16* (2006.01)
*H04L 12/12* (2006.01)
(Continued)

(52) U.S. Cl.
CPC ............... *H04L 12/12* (2013.01); *H04B 1/40* (2013.01); *H04L 12/40006* (2013.01);
(Continued)

(58) Field of Classification Search
CPC ........ H04B 1/402; H04B 3/23; H04L 27/2601
(Continued)

(56) References Cited

U.S. PATENT DOCUMENTS 4,979,174 A 12/1990 Cheng et al.
5,021,983 A 6/1991 Nguyen et al.
(Continued)

FOREIGN PATENT DOCUMENTS

EP 0473465 3/1992
EP 0473465 B1 3/1996
(Continued)

OTHER PUBLICATIONS

Bingham, "Multicarrier Modulation for Data Transmission: An Idea Whose Time Has Come," IEEE Communications Magazine, May 1990, vol. 28(5), pp. 5-8, 11.
(Continued)

*Primary Examiner* — Khai Tran
(74) *Attorney, Agent, or Firm* — Jason H. Vick; Sheridan Ross, PC

(57) ABSTRACT

A multicarrier transceiver is provided with a sleep mode in which it idles with reduced power consumption when it is not needed to transmit or receive data. The full transmission and reception capabilities of the transceiver are quickly restored when needed, without requiring the full (and time-consuming) initialization commonly needed to restore such transceivers to operation after inactivity.

20 Claims, 4 Drawing Sheets

Related U.S. Application Data continuation of application No. 14/092,248, filed on Nov. 27, 2013, now Pat. No. 8,750,352, which is a continuation of application No. 13/887,889, filed on May 6, 2013, now Pat. No. 8,611,404, which is a continuation of application No. 13/152,558, filed on Jun. 3, 2011, now Pat. No. 8,437,382, which is a continuation of application No. 12/615,946, filed on Nov. 10, 2009, now Pat. No. 7,978,753, which is a continuation of application No. 11/425,507, filed on Jun. 21, 2006, now Pat. No. 7,697,598, which is a continuation of application No. 11/289,516, filed on Nov. 30, 2005, now abandoned, which is a continuation of application No. 11/090,183, filed on Mar. 28, 2005, now abandoned, which is a continuation of application No. 10/778,083, filed on Feb. 17, 2004, now abandoned, which is a continuation of application No. 10/175,815, filed on Jun. 21, 2002, now abandoned, which is a continuation of application No. 09/581,400, filed as application No. PCT/US99/01539 on Jan. 26, 1999, now Pat. No. 6,445,730.

(60) Provisional application No. 60/072,447, filed on Jan. 26, 1998.

(51) Int. Cl.
| | |
|---|---|
| *H04B 1/40* | (2015.01) |
| *H04L 12/40* | (2006.01) |
| *H04L 27/26* | (2006.01) |
| *H04M 11/06* | (2006.01) |
| *H04W 52/02* | (2009.01) |

(52) U.S. Cl.
CPC ......... *H04L 27/2601* (2013.01); *H04M 11/06* (2013.01); *H04W 52/0235* (2013.01); *H04W 52/0241* (2013.01); *H04L 12/40169* (2013.01); *Y02B 60/50* (2013.01)

(58) Field of Classification Search
USPC ............... 375/219, 220, 222, 260, 282, 356, 373, 375/376; 370/311, 378, 505; 455/500, 551, 560, 455/574
See application file for complete search history.

(56) References Cited

U.S. PATENT DOCUMENTS

| | | | |
|---|---|---|---|
| 5,163,153 A | 11/1992 | Cole et al. | |
| 5,206,886 A | 4/1993 | Bingham | |
| 5,214,501 A | 5/1993 | Cavallerano et al. | |
| 5,224,152 A | 6/1993 | Harte | |
| 5,241,680 A | 8/1993 | Cole et al. | |
| 5,287,384 A | 2/1994 | Avery et al. | |
| 5,351,016 A | 9/1994 | Dent | |
| 5,420,640 A | 5/1995 | Munich et al. | |
| 5,422,913 A | 6/1995 | Wilkinson | |
| 5,428,790 A | 6/1995 | Harper et al. | |
| 5,440,556 A | 8/1995 | Edem et al. | |
| 5,452,288 A | 9/1995 | Rahuel et al. | |
| 5,487,069 A | 1/1996 | O'Sullivan et al. | |
| 5,519,757 A | 5/1996 | Torin | |
| 5,566,366 A | 10/1996 | Russo et al. | |
| 5,581,556 A | 12/1996 | Ohie | |
| 5,590,396 A | 12/1996 | Henry | |
| 5,592,173 A | 1/1997 | Lau et al. | |
| 5,596,604 A | 1/1997 | Cioffi et al. | |
| 5,627,882 A | 5/1997 | Chien et al. | |
| 5,635,864 A | 6/1997 | Jones | |
| 5,675,585 A | 10/1997 | Bonnot et al. | |
| 5,710,975 A | 1/1998 | Bernhardt et al. | |
| 5,745,275 A | 4/1998 | Giles et al. | |
| 5,751,338 A | 5/1998 | Ludwig, Jr. | |
| 5,764,649 A | 6/1998 | Tong | |
| 5,764,693 A | 6/1998 | Taylor et al. | |
| 5,793,759 A | 8/1998 | Rakib et al. | |
| 5,822,374 A | 10/1998 | Levin | |
| 5,835,527 A | 11/1998 | Lomp | |
| 5,838,720 A | 11/1998 | Morelli | |
| 5,842,028 A | 11/1998 | Vajapey | |
| 5,852,630 A | 12/1998 | Langberg et al. | |
| 5,870,673 A | 2/1999 | Haartsen | |
| 5,901,180 A | 5/1999 | Aslanis et al. | |
| 5,903,612 A | 5/1999 | Van Der Puttent et al. | |
| 5,905,874 A | 5/1999 | Johnson | |
| 5,917,340 A | 6/1999 | Manohar et al. | |
| 5,956,323 A | 9/1999 | Bowie | |
| 5,960,344 A | 9/1999 | Mahany | |
| 5,995,539 A | 11/1999 | Miller | |
| 6,038,436 A * | 3/2000 | Priest | H04W 52/0238 340/7.33 |
| 6,041,057 A | 3/2000 | Stone | |
| 6,047,378 A | 4/2000 | Garrett et al. | |
| 6,052,411 A | 4/2000 | Mueller et al. | |
| 6,055,268 A | 4/2000 | Timm et al. | |
| 6,072,784 A * | 6/2000 | Agrawal | H04W 52/28 370/311 |
| 6,081,291 A | 6/2000 | Ludwig, Jr. | |
| 6,084,917 A | 7/2000 | Kao et al. | |
| 6,085,114 A | 7/2000 | Gibbons et al. | |
| 6,154,642 A | 11/2000 | Dumont et al. | |
| 6,157,816 A | 12/2000 | Andersone et al. | |
| 6,226,322 B1 | 5/2001 | Mukherjee | |
| 6,236,674 B1 | 5/2001 | Morelli et al. | |
| 6,246,725 B1 | 6/2001 | Vanzieleghem et al. | |
| 6,278,864 B1 | 8/2001 | Cummins et al. | |
| 6,308,278 B1 | 10/2001 | Khouli et al. | |
| 6,332,086 B2 | 12/2001 | Avis | |
| 6,347,236 B1 | 2/2002 | Gibbons et al. | |
| 6,359,938 B1 | 3/2002 | Keevill et al. | |
| 6,377,809 B1 | 4/2002 | Rezaiifar et al. | |
| 6,389,062 B1 | 5/2002 | Wu | |
| 6,421,323 B1 | 7/2002 | Nelson et al. | |
| 6,424,646 B1 | 7/2002 | Gerszberg et al. | |
| 6,445,730 B1 | 9/2002 | Greszczuk et al. | |
| 6,473,418 B1 | 10/2002 | Laroia et al. | |
| 6,567,473 B1 | 5/2003 | Tzannes | |
| 6,578,162 B1 | 6/2003 | Yung | |
| 6,640,239 B1 | 10/2003 | Gidwani | |
| 6,654,410 B2 | 11/2003 | Tzannes | |
| 6,657,949 B1 | 12/2003 | Jones, IV et al. | |
| 6,754,290 B1 | 6/2004 | Halter | |
| 6,904,537 B1 | 6/2005 | Gorman | |
| 6,978,149 B1 | 12/2005 | Moreilli et al. | |
| 7,024,592 B1 | 4/2006 | Voas et al. | |
| 7,200,138 B2 | 4/2007 | Liu | |
| 7,203,206 B2 | 4/2007 | Amidan et al. | |
| 7,292,627 B2 | 11/2007 | Tzannes | |
| 7,400,688 B2 | 7/2008 | Garrett | |
| 7,463,872 B2 | 12/2008 | Jin et al. | |
| 7,697,598 B2 | 4/2010 | Greszczuk et al. | |
| 7,978,753 B2 | 7/2011 | Greszczuk et al. | |
| 8,412,964 B2 | 4/2013 | Lee et al. | |
| 8,437,382 B2 | 5/2013 | Greszczuk et al. | |
| 8,565,712 B2 | 10/2013 | Rotzoll | |
| 8,611,404 B2 | 12/2013 | Greszczuk et al. | |
| 8,750,352 B2 | 6/2014 | Greszczuk et al. | |
| 9,094,268 B2 | 7/2015 | Greszczuk et al. | |
| 2002/0015401 A1 | 2/2002 | Subramanian et al. | |
| 2002/0150152 A1 | 10/2002 | Greszczuk et al. | |
| 2003/0131209 A1 | 7/2003 | Lee | |
| 2004/0120435 A1 | 6/2004 | Yang et al. | |
| 2004/0160906 A1 | 8/2004 | Greszczuk et al. | |
| 2005/0079889 A1 | 4/2005 | Vaglica et al. | |

(56) References Cited

U.S. PATENT DOCUMENTS

| | | | |
|---|---|---|---|
| 2005/0185726 | A1 | 8/2005 | Greszczuk et al. |
| 2006/0078060 | A1 | 4/2006 | Greszczuk et al. |
| 2012/0108169 | A1 | 5/2012 | Degauque et al. |

FOREIGN PATENT DOCUMENTS

| | | |
|---|---|---|
| EP | 0840474 | 5/1998 |
| JP | H04-227348 A | 8/1992 |
| JP | H05-095315 | 4/1993 |
| JP | H06-114196 | 4/1994 |
| JP | H06-169278 | 6/1994 |
| JP | H06-296176 A | 10/1994 |
| JP | H06-311080 | 11/1994 |
| JP | H07-079265 | 3/1995 |
| JP | H07-086995 | 3/1995 |
| JP | H09-275587 | 10/1997 |
| JP | H10-327309 | 12/1998 |
| KR | 1998-26703 | 8/1998 |
| WO | WO 98/09461 | 3/1998 |
| WO | WO 98/35473 | 8/1998 |
| WO | WO 98/47238 | 10/1998 |
| WO | WO 99/20027 | 4/1999 |
| WO | WO 00/45559 | 3/2000 |
| WO | WO 00/41395 | 7/2000 |
| WO | WO 01/11833 | 2/2001 |

OTHER PUBLICATIONS

Series G: Transmission Systems and Media, Digital Systems and Networks, "Spitterless Asymmetric Digital Subscriber Line (ADSL) transceivers," ITU-T G.992.2, International Telecommunication Union, Jun. 1999, 179 pages.
Macq et al., "A CMOS activity detector for ADSL link," ESSCIRC 1995, 21st European Solid-State Circuits Conference, Sep. 19-21, 1995, pp. 430-433.
International Search Report for International (PCT) App. No. PCT/US99/01539, mailed Oct. 29, 1999.
International Preliminary Examination Report for International (PCT) App. No. PCT/US99/01539, mailed Dec. 6, 2000.
Examiners First Report for Australian Patent Application No. 23409/99, dated Feb. 7, 2003.
Notice of Acceptance for Australian Patent Application No. 23409/99, dated Jul. 25, 2003.
Official Action for Canadian Patent Application No. 2357551, dated Nov. 23, 2005.
Notice of Allowance for Canadian Patent Application No. 2357551, dated Dec. 14, 2007.
Official Action for Canadian Patent Application No. 2,633,064, dated Oct. 31, 2008.
Official Action for Canadian Patent Application No. 2,633,064, dated Aug. 17, 2009.
Notice of Allowance for Canadian Patent Application No. 2,633,064, dated Mar. 5, 2010.
Official Action for Canadian Patent Application No. 2,633,064, dated Oct. 15, 2010.
Official Action for Canadian Patent Application No. 2,800,005, dated Jun. 11, 2014.
Official Action for Canadian Patent Application No. 2,800,005, dated Apr. 13, 2015.
Communication under Rule 51(4) EPC, dated Apr. 22, 2004, granting European Patent Application No. 99 909 970.7-2411.
European Search Report for European Patent Application No. EP 04022871, dated Jul. 6, 2005.
Communication under Rule 51(4) EPC, dated May 7, 2007, granting European Patent Application No. 04022871.0.
Extended European Search Report and Opinion for European Patent Application No. 07021150, dated Feb. 15, 2008.
European Examination Report for European Patent Application No. 07021150, dated Oct. 9, 2008.
Official Action for European Patent Application No. 07021150, dated May 6, 2010.
Communication under Rule 71(3) EPC for European Patent Application No. 07021150.3, dated May 30, 2011.
Extended European Search Report for European Patent Application No. 10011996.5, dated Dec. 21, 2011.
Official Action for European Patent Application No. 10011996.5, dated May 29, 2013.
Communication Under Rule 71(3) EPC—Intention to Grant for European Patent Application No. 10011996.5, dated Mar. 25, 2015.
European Search Report for European Patent Application No. EP 10012013.8, mailed Dec. 27, 2011.
Communication under Rule 71(3) EPC, dated Jul. 5, 2013 granting European Patent Application No. 10012013.8.
Communication under Rule 71(3) EPC, dated Mar. 12, 2014 granting European Patent Application No. 10012013.8.
Decision to Grant a European Patent Pursuant to Article 97(1) EPC, dated Apr. 3, 2014 for European Patent Application No. 10012013.8.
Notice of Reasons for Rejection (including translation) for Japanese Patent Application No. 2000-596705, mailed Aug. 19, 2008.
Notice of Allowance for Japanese Patent Application No. 2000-596705, mailed Mar. 16, 2009.
Notification of Reasons for Rejection (including translation) for Japanese Patent Application No. 2008-323651, mailed Feb. 8, 2010.
Notification of Reasons for Refusal (including translation) for Japanese Patent Application No. 2008-323651, mailed Mar. 7, 2011.
Decision of Final Rejection for Japanese Patent Application No. 2008-323651, mailed Nov. 28, 2011.
English Translation of Preliminary Rejection re: Korean Application No. 2000-7009402, issued Nov. 15, 2005.
Official Action for U.S. Appl. No. 09/581,400 mailed Mar. 13, 2002.
Notice of Allowance for U.S. Appl. No. 09/581,400 mailed Jun. 17, 2002.
Official Action for U.S. Appl. No. 10/175,815 mailed Nov. 17, 2003.
Official Action for U.S. Appl. No. 10/778,083 mailed Nov. 30, 2004.
Official Action for U.S. Appl. No. 11/090,183 mailed Sep. 12, 2005.
Official Action for U.S. Appl. No. 11/289,516 mailed Mar. 27, 2006.
Official Action for U.S. Appl. No. 11/425,507, mailed Nov. 28, 2007.
Official Action for U.S. Appl. No. 11/425,507, mailed Aug. 22, 2008.
Official Action for U.S. Appl. No. 11/425,507, mailed Apr. 27, 2009.
Notice of Allowance for U.S. Appl. No. 11/425,507, mailed Sep. 22, 2009.
Official Action for U.S. Appl. No. 12/615,946, mailed Aug. 6, 2010.
Notice of Allowance for U.S. Appl. No. 12/615,946, mailed Apr. 25, 2011.
Official Action for U.S. Appl. No. 13/152,558, mailed Jun. 1, 2012.
Notice of Allowance for U.S. Appl. No. 13/152,558, mailed Feb. 4, 2013.
Official Action for U.S. Appl. No. 13/887,889 mailed Sep. 6, 2013.
Notice of Allowance for U.S. Appl. No. 13/887,889 mailed Oct. 23, 2013.
Official Action for U.S. Appl. No. 14/092,248 mailed Jan. 13, 2014.
Notice of Allowance for U.S. Appl. No. 14/092,248 mailed Mar. 18, 2014.
Official Action for U.S. Appl. No. 14/295,981 mailed Jan. 14, 2015.
Notice of Allowance for U.S. Appl. No. 14/295,981 mailed May 19, 2015.
Documents filed with District Court Proceedings for *TQ Delta, LLC v. Zhone Technologies Inc.;* U.S. District Court, for the District of Delaware (Wilmington); Civil Action No. 1:13-cv-01836-RGA; Includes documents filed from Dec. 16, 2015-Jan. 6, 2016; (193 pages).
Documents filed with District Court Proceedings for *TQ Delta, LLC v. Zhone Technologies Inc.;* U.S. District Court, for the District of Delaware (Wilmington); Civil Action No. 1:13-cv-01836-RGA; Includes documents filed from Jan. 20, 2016-Feb. 8, 2016; (252 pages).
Documents filed with District Court Proceedings for *TQ Delta, LLC v. Zyxel Communications Inc. et al.;* U.S. District Court, for the

(56) References Cited

OTHER PUBLICATIONS

District of Delaware (Wilmington); Civil Action No. 1:13-cv-02013-RGA; Includes documents filed from Dec. 16, 2015-Dec. 16, 2015; (48 pages).
Documents filed with District Court Proceedings for *TQ Delta, LLC v. Zyxel Communications Inc. et al.;* U.S. District Court, for the District of Delaware (Wilmington); Civil Action No. 1:13-cv-02013-RGA; Includes documents filed from Jan. 20, 2016-Feb. 8, 2016; (349 pages).
Documents filed with District Court Proceedings for *TQ Delta, LLC v. Adtran Inc.;* U.S. District Court, for the District of Delaware (Wilmington); Civil Action No. 1:14-cv-00954-RGA; Includes documents filed from Jan. 20, 2016-Feb. 8, 2016; (81 pages).
Documents filed with District Court Proceedings for *TQ Delta, LLC v. Comcast Cable Communications LLC;* U.S. District Court, for the District of Delaware (Wilmington); Civil Action No. 1:15-cv-00611-RGA; Includes documents filed from Nov. 13, 2015-Dec. 11, 2015; (89 pages).
Documents filed with District Court Proceedings for *TQ Delta, LLC v. Comcast Cable Communications LLC;* U.S. District Court, for the District of Delaware (Wilmington); Civil Action No. 1:15-cv-00611-RGA; Includes documents filed from Dec. 18, 2015-Jan. 7, 2016; (13 pages).
Documents filed with District Court Proceedings for *TQ Delta, LLC v. Comcast Cable Communications LLC;* U.S. District Court, for the District of Delaware (Wilmington); Civil Action No. 1:15-cv-00611-RGA; Includes documents filed from Jan. 14, 2016-Feb. 5, 2016; (356 pages).
Documents filed with District Court Proceedings for *TQ Delta, LLC v. Coxcom LLC et al.;* U.S. District Court, for the District of Delaware (Wilmington); Civil Action No. 1:15-cv-00612-RGA; Includes documents filed from Nov. 18, 2015-Jan. 6, 2016; (95 pages).
Documents filed with District Court Proceedings for *TQ Delta, LLC v. Coxcom LLC et al.;* U.S. District Court, for the District of Delaware (Wilmington); Civil Action No. 1:15-cv-00612-RGA; Includes documents filed from Jan. 14, 2016-Feb. 5, 2016—(361 pages).
Documents filed with District Court Proceedings for *TQ Delta, LLC v. DIRECTV LLC;* U.S. District Court, for the District of Delaware (Wilmington); Civil Action No. 1:15-cv-00613-RGA; Includes documents filed from Nov. 23, 2015-Jan. 6, 2016; (45 pages).
Documents filed with District Court Proceedings for *TQ Delta, LLC v. DIRECTV LLC;* U.S. District Court, for the District of Delaware (Wilmington); Civil Action No. 1:15-cv-00613-RGA; Includes documents filed from Jan. 19, 2016-Feb. 4, 2016; (358 pages).
Documents filed with District Court Proceedings for *TQ Delta, LLC v. Dish Network Corporation et al.;* U.S. District Court, for the District of Delaware (Wilmington); Civil Action No. 1:15-cv-00614-RGA; Includes documents filed from Nov. 30, 2015-Jan. 5, 2016; (22 pages).
Documents filed with District Court Proceedings for *TQ Delta, LLC v. Dish Network Corporation et al.;* U.S. District Court, for the District of Delaware (Wilmington); Civil Action No, 1:15-cv-00614-RGA; Includes documents filed from Jan. 19, 2016-Feb. 5, 2016; (365 pages).
Documents filed with District Court Proceedings for *TQ Delta, LLC v. Time Warner Cable Inc., et al.;* U.S. District Court, for the District of Delaware (Wilmington); Civil Action No. 1:15-cv-00615-RGA; Includes documents filed from Nov. 30, 2015-Jan. 6, 2016; (24 pages).
Documents filed with District Court Proceedings for *TQ Delta, LLC v. Time Warner Cable Inc., et al.;* U.S. District Court, for the District of Delaware (Wilmington); Civil Action No. 1:15-cv-00615-RGA; Includes documents filed from Jan. 14, 2016-Feb. 5, 2016; (361 pages).
Documents filed with District Court Proceedings for *TQ Delta, LLC v. Verizon Services Corp;* U.S. District Court, for the District of Delaware (Wilmington); Civil Action No. 1:15-cv-00616-RGA; Includes documents filed from Nov. 23, 2015-Jan. 7, 2016; (32 pages).
Documents filed with District Court Proceedings for *TQ Delta, LLC v. Verizon Services Corp;* U.S. District Court, for the District of Delaware (Wilmington); Civil Action No. 1:15-cv-00616-RGA; Includes documents filed from Jan. 14, 2016-Feb. 5, 2016; (354 pages).
U.S. Appl. No. 60/078,549, filed Mar. 19, 1998, Jacobsen.
Bauer, Rainer et al. "Iterative Source/Channel-Decoding Using Reversible Variable Length Codes" Munich University of Technology, 2000 (10 pages).
Business Wire "New FatPipe T1 Speed Product Produces Speeds up to 4.5Mbps and Redundancy for a Fraction of the Cost of a Fractional T3!" Business Wire, Oct. 16, 1998 (2 pages).
Cisco Systems, Inc. "Alternatives for High Bandwidth Connections Using Parallel T1/E1 Links" 1998 (8 pages).
Goodman, David et al. "Maximizing the Throughput to CDMA Data Communications" Polytechnic University, Brooklyn, NY, Oct. 2003 (5 pages).
ITU-T Recommendation G.992.3, "Asymmetric Digital Subscriber Line Transceivers 2 (ADSL2)" International Telecommunication Union, Apr. 2009, 404 pages.
ITU-T Recommendation G.992.3 Annex C, "Annex C: Specific Requirements for an ADSL System Operating in the Same Cable as ISDN as Defined in Appendix III of Recommendation ITU-T G.961" International Telecommunication Union, Apr. 2009, 296 pages.
Johns, David A., et al. "Integrated Circuits for Data Transmission Over Twisted-Pair Channels" IEEE Journal of Solid-State Circuits, vol. 32, Nov. 3, Mar. 1997 (9 pages).
Petzold, Mark C. et al. "Multicarrier Spread Spectrum Performance in Fading Channels with Serial Concatenated Convolutional Coding" IEEE 1998 (4 pages).
Sklower, K. et al. "The PPP Multilink Protocol (MP)" Network Working Group, Nov. 1994 (15 pages).
TP3410 ISDN Basic Access Echo-Cancelling 2B1Q U Transceiver; National Semiconductor; Sep. 1994 (32 pages).
Wolman, Alec et al. "Latency Analysis of TCP on an ATM Network" University of Washington, Printed Sep. 19, 2014 (14 pages).
Documents filed with District Court Proceedings for *TQ Delta, LLC v. Zhone Technologies Inc.;* U.S. District Court, for the District of Delaware (Wilmington); Civil Action No. 113-cv-01836-RGA; Includes documents filed from Nov. 4, 2013-Nov. 30, 2015; (1722 pages).
Defendant Zhone Technologies, Inc.'s Invalidity Contentions with Regard to Representative Asserted Claims for *TQ Delta, LLC v. Zhone Technologies, Inc.*—Including Claim Charts for Family 7 with Exhibits 120-133; In the United States District Court for the District of Delaware; Civil Action No. 13-01836-RGA; filed Sep. 25, 2015 (266 pages).
Documents filed with District Court Proceedings for *TQ Delta, LLC v. Zyxel Communications Inc. et al.;* U.S. District Court, for the District of Delaware (Wilmington); Civil Action No. 1:13-cv-02013-RGA; Includes documents filed from Dec. 9, 2013-Nov. 30, 2015; (1996 pages).
Defendant Zyxel's Initial Invalidity Contentions with Respect to Representative Asserted Claims for *TQ Delta, LLC v. Zyxel Communications, Inc. and Zyxel Communications Corporation*—Including Claim Charts for Family 7 with Exhibits G1-G14; In the United States District Court for the District of Delaware; Civil Action No. 13-02013-RGA; filed Sep. 25, 2015 (252 pages).
Documents filed with District Court Proceedings for *TQ Delta, LLC v. Adtran Inc.;* U.S. District Court, for the District of Delaware (Wilmington); Civil Action No. 1:14-cv-00954-RGA; Includes documents filed from Jul. 17, 2014-Oct. 19, 2015; (2,489 pages).
Documents filed with District Court Proceedings for *TQ Delta, LLC v. Comcast Cable Communications LLC;* U.S. District Court, for the District of Delaware (Wilmington); Civil Action No. 1:15-cv-00611-RGA; Includes documents filed from Jul. 17, 2015-Nov. 6, 2015; (338 pages).
Documents filed with District Court Proceedings for *TQ Delta, LLC v. Coxcom LLC et al.;* U.S. District Court, for the District of

(56) References Cited

OTHER PUBLICATIONS

Delaware (Wilmington); Civil Action No. 1:15-cv-00612-RGA; Includes documents filed from Jul. 17, 2015-Nov. 13, 2015; (353 pages).
Documents filed with District Court Proceedings for *TQ Delta, LLC v. DIRECTV LLC;* U.S. District Court, for the District of Delaware (Wilmington); Civil Action No. 1:15-cv-00613-RGA; Includes documents filed from Jul. 17, 2015-Nov. 23 2015; (460 pages).
Documents filed with District Court Proceedings for *TQ Delta, LLC v. Dish Network Corporation et al.;* U.S. District Court, for the District of Delaware (Wilmington); Civil Action No. 1:15-cv-00614-RGA; Includes documents filed from Jul. 17, 2015-Nov. 23, 2015; (583 pages).
Documents filed with District Court Proceedings for *TQ Delta, LLC v. Time Warner Cable Inc., et al.;* U.S. District Court, for the District of Delaware (Wilmington); Civil Action No 1:15-cv-00615-RGA; Includes documents filed from Jul. 17, 2015-Nov. 24, 2015; (415 pages).
Documents filed with District Court Proceedings for *TQ Delta, LLC v. Verizon Services Corp;* U.S. District Court, for the District of Delaware (Wilmington); Civil Action No. 1:15-cv-00616-RGA; Includes documents filed from Jul. 17, 2015-Nov. 18, 2015; (432 pages).
U.S. Appl. No. 60/052,937, filed Jul. 17, 1997, Langberg et al.
ITU—Telecommunication Standardization Sector—Draft ANSI Standard T1-413-1998 "Courtesy Copy—ANSI T1.413 Issue 2 Letter Ballot" Jun. 5, 1998 (278 pages).
Documents filed with District Court Proceedings for *TQ Delta, LLC v. Zhone Technologies Inc.;* U.S. District Court, for the District of Delaware (Wilmington); Civil Action No, 1:13-cv-01836-RGA; Includes documents filed from Feb. 9, 2016-Mar. 2, 2016—Docket Nos. 125-142; (225 pages).
Documents filed with District Court Proceedings for *TQ Delta, LLC v. Zhone Technologies Inc.;* U.S. District Court, for the District of Delaware (Wilmington): Civil Action No. 1:13-cv-01836-RGA; Includes documents filed from Mar. 17, 2016-Apr. 22, 2016; Docket Nos. 165-193; (152 pages).
Documents filed with District Court Proceedings for *TQ Delta, LLC v. Zyxel Communications Inc.,* et al.; U.S. District Court, for the District of Delaware (Wilmington); Civil Action No. 1:13-cv-02013-RGA; Includes documents filed from Feb. 9, 2016-Mar. 2, 2015; Docket Nos. 140-157; (223 pages).
Documents filed with District Court Proceedings for *TQ Delta, LLC v. Zyxel Communications Inc.* et al.; U.S. District Court, for the District of Delaware (Wilmington); Civil Action No. 1:13-cv-02013-RGA; Includes documents filed from Mar. 17, 2016-Apr. 22, 2016; Docket Nos. 180-208; (152 pages.).
Documents filed with District Court Proceedings for *TQ Delta, LLC v. Adtran Inc.;* U.S. District Court, for the District of Delaware (Wilmington); Civil Action No. 1:14-cv-00954-RGA; Includes documents filed from Feb. 9, 2016-Mar. 1, 2016; Docket Nos. 69-72; (13 pages).
Defendant Adtran, Inc.'s Preliminary Invalidity Contentions with Regard to Representative Asserted Claims for *TQ Delta, LLC v. Adtran, Inc.*—Including Claim Charts for Family 7 as Exhibits 7-1-7-7; U.S. District Court, for the District of Delaware (Wilmington); Civil Action No. 1:15-cv-00121-RGA; filed Feb. 9, 2016 (330 pages).
Documents filed with District Court Proceedings for *Adtran Inc. v. TQ Delta, LLC;* U.S. District Court, for the District of Delaware (Wilmington); Civil Action No. 1:15-cv-00121-RGA; Includes documents filed from Jul. 17, 2014-Mar. 1, 2016 Docket Nos. 1-77; (1,444) pages).
Documents filed with District Court Proceedings for *Adtran Inc. vs. TQ Delta, LLC;* U.S. District Court, for the Northern District of Alabama (Northeastern); Civil Action No. 5:14-cv-01381-JEO; Includes documents filed from Jul. 17, 2014-Jan. 27, 2015—Docket Nos. 1-32; (568 pages).
Documents filed with District Court Proceedings for *TQ Delta, LLC v. Comcast Cable Communications LLC;* U.S. District Court, for the District of Delaware (Wilmington); Civil Action No. 1:15-cv-00611-RGA; Includes documents filed from Feb. 19, 2016-Mar. 4, 2016—Docket Nos. 46-48; (93 pages).
Documents filed with District Court Proceedings for *TQ Delta, LLC v. Comcast Cable Communications LLC;* U.S. District Court, for the District of Delaware (Wilmington); Civil Action No. 1:15-cv-00611-RGA; Includes documents filed from Mar. 23, 2016-Apr. 22, 2016—Docket Nos. 49-54; (25 pages).
Documents filed with District Court Proceedings for *TQ Delta, LLC v. Coxcom LLC* et al.; U.S. District Court, for the District of Delaware (Wilmington); Civil Action No. 1:15-cv-00612-RGA; Includes documents filed from Feb. 19, 2016-Mar. 4, 2016; Docket Nos. 46-48 (93 pages).
Documents filed with District Court Proceedings for *TQ Delta, LLC v. Coxcom LLC* et al.; U.S. District Court, for the District of Delaware (Wilmington); Civil Action No. 1:15-cv-00612-RGA; Includes documents filed from Mar. 23, 2016-Apr. 22, 2016; Docket Nos. 49-53 (23 pages).
Documents filed with District Court Proceedings for *TQ Delta, LLC v. Directv LLC;* U.S. District Court, for the District of Delaware (Wilmington); Civil Action No. 1:15-cv-00613-RGA; Includes documents filed from Feb. 16, 2016-Mar. 4, 2016; Docket Nos. 46-50; (99 pages).
Documents filed with District Court Proceedings for *TQ Delta, LLC v. Directv LLC;* U.S. District Court, for the District of Delaware (Wilmington); Civil Action No. 1:15-cv-00613-RGA; Includes documents filed from Mar. 23, 2016-Apr. 25, 2016; Docket Nos. 51-60; (33 pages).
Documents filed with District Court Proceedings for *TQ Delta, LLC v. Dish Network Corporation* et al.; U.S. District Court, for the District of Delaware (Wilmington); Civil Action No. 1:15-cv-00614-RGA; Includes documents filed from Feb. 19, 2016-Mar. 7, 2016; Docket Nos. 49-52; (95 pages).
Documents filed with District Court Proceedings for *TQ Delta, LLC v. Dish Network Corporation* et al.; U.S. District Court, for the District of Delaware (Wilmington); Civil Action No. 1:15-cv-00614-RGA; Includes documents filed from Mar. 23, 2016-Apr. 25, 2016; Docket Nos. 54-59; (23 pages).
Documents filed with District Court Proceedings for *TQ Delta, LLC v. Time Warner Cable Inc.*, et al.; U.S. District Court, for the District of Delaware (Wilmington); Civil Action No. 1:15-cv00615-RGA, Includes documents filed from Feb. 19, 2016-Mar. 4, 2016; Docket Nos. 44- 46; (93 pages).
Documents filed with District Court Proceedings for *TQ Delta, LLC v. Time Warner Cable Inc.*, et al.; U.S. District Court, for the District of Delaware (Wilmington); Civil Action No. 1:15-cv00615-RGA; Includes documents filed from Mar. 23, 2016-Apr. 22, 2016; Docket Nos. 47- 51; (23 pages).
Documents filed with District Court Proceedings for *TQ Delta, LLC v. Verizon Services Corp;* U.S. District Court, for the District of Delaware (Wilmington); Civil Action No. 1:15-cv00616-RGA; Includes documents filed from Feb. 19, 2016-Mar. 4, 2016; Docket Nos. 46- 48; (93 pages).
Documents filed with District Court Proceedings for *TQ Delta, LLC v. Verizon Services Corp;* U.S. District Court, for the District of Delaware (Wilmington); Civil Action No. 1:15-cv00616-RGA; Includes documents filed from Mar. 23, 2016-Apr. 22, 2016; Docket Nos. 49- 55;(21 pages).
Documents filed with District Court Proceedings for *TQ Delta, LLC v. Zhone Technologies Inc.;* U.S. District Court, for the District of Delaware (Wilmington); Civil Action No. 1:13-cv-01836-RGA; Includes documents filed on Feb. 25, 2016, made publically available May 25, 2016; Docket No. 140; (40 pages).
Documents filed with District Court Proceedings for *TQ Delta, LLC v. Zhone Technologies Inc.;* U.S. District Court, for the District of Delaware (Wilmington); Civil Action No. 1:13-cv-01836-RGA; includes documents filed from Apr. 27, 2016-May 24, 2016; Docket Nos. 194-211; (813 pages).
Documents filed with District Court Proceedings for *TQ Delta, LLC v. Zyxel Communications Inc.* et al.; U.S. District Court, for the District of Delaware (Wilmington); Civil Action No. 1:13-ov-02013-RGA; Includes documents filed on Feb. 25, 2016, made publically available May 25, 2016; Docket No. 155; (40 pages).

(56) References Cited

OTHER PUBLICATIONS

Documents filed with District Court Proceedings for *TQ Delta, LLC v. Zyxel Communications Inc.* et al.; U.S. District Court, for the District of Delaware (Wilmington); Civil Action No. 1:13-cv-02013-RGA; Includes documents filed from Apr. 27, 2016-May 24, 2016; Docket Nos. 209-226; (809 pages).
Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from Mar. 28, 2016-May 31, 2016—Docket Nos. 74-77; (8 pages).
Documents filed with District Court Proceedings for *Adtran Inc. v. TQ Delta, LLC*; U.S. District Court, for the District of Delaware (Wilmington); Civil Action No. 1:15-cv-00121-RGA; Includes documents filed from Mar. 28, 2016-May 31, 2016; Docket Nos. 79-82; (8 pages).
Documents filed with District Court Proceedings for *TQ Delta, LLC v. Comcast Cable Communications LLC*; U.S. District Court, for the District of Delaware (Wilmington); Civil Action No. 1:15-cv-00611-RGA; Includes documents filed from Apr. 29, 2016-May 27, 2016—Docket Nos. 59-75; (722 pages).
Documents filed with District Court Proceedings for *TQ Delta, LLC v. Coxcom LLC* et al.; U.S. District Court, for the District of Delaware (Wilmington); Civil Action No. 1:15-cv-00612-RGA; Includes documents filed from Apr. 29, 2016-May 27, 2016; Docket Nos. 58-72 (716 pages).
Documents filed with District Court Proceedings for *TQ Delta, LLC v. Directv LLC*; U.S. District Court, for the District of Delaware (Wilmington); Civil Action No. 1:15-cv-00613-RGA; Includes documents filed from Apr. 29, 2016-May 27, 2016; Docket Nos. 65-79; (716 pages).
Documents filed with District Court Proceedings for *TQ Delta, LLC v. Dish Network Corporation* et al.; U.S. District Court, for the District of Delaware (Wilmington); Civil Action No. 1;15-cv-00614-RGA; Includes documents filed from Apr. 29, 2016-May 27, 2016; Docket Nos. 64-82; (856 pages).
Documents filed with District Court Proceedings for *TQ Delta, LLC v. Time Warner Cable Inc.*, et al.; U.S. District Court, for the District of Delaware (Wilmington); Civil Action No. 1:15-cv00615-RGA; Includes documents filed from Apr. 29, 2016-May 27, 2016; Docket Nos. 56- 71; (718 pages).
Documents filed with District Court Proceedings for *TQ Delta, LLC v. Verizon Services Corp*; U.S. District Court, for the District of Delaware (Wilmington); Civil Action No. 1:15-cv00616-RGA; Includes documents filed on Apr. 13, 2016 and from Apr. 29, 2016-May 27, 2016; Docket Nos. 51; and 60-74; (721 pages).
Official Action for Canadian Patent Application No. 2,800,005, dated Apr. 25, 2016.
U.S. Appl. No. 15/180,274, filed Jun. 13, 2016, Greszczuk et al.
Documents filed with District Court Proceedings for *TQ Delta, LLC v. Zhone Technologies Inc.*; U.S. District Court, for the District of Delaware (Wilmington); Civil Action No. 1:13-cv-01836-RGA; Includes documents filed on Mar. 3, 2016 made publically available Jun. 1, 2016; Docket Nos. 143; (61 pages).
Documents filed with District Court Proceedings for *TQ Delta, LLC v. Zhone Technologies Inc.*; U.S. District Court, for the District of Delaware (Wilmington); Civil Action No. 1:13-cv-01836-RGA; Includes documents filed from Jun. 3, 2016-Jun. 7, 2016; Docket Nos. 212-215; (138 pages).
Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed on Mar. 3, 2016, made publically Jun. 1, 2016; Docket No. 158; (61 pages).
Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed from Jun. 3, 2016-Jun. 13, 2016; Docket Nos. 227-232; (140 pages).
Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed from Jun. 14, 2016; Docket Nos. 233; (2 pages).
Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from Mar. 8, 2016, made publically available Jun. 6, 2016—Docket No. 73; (60 pages).
Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from Jun. 7, 2016-Jun. 8, 2016; Docket Nos. 78-80; (73 pages).
Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from Jun. 15, 2016; Docket Nos. 81; (2 pages).
Documents filed with District Court Proceedings for *Adtran Inc. v. TQ Delta, LLC* ; U.S. District Court, for the District of Delaware (Wilmington); Civil Action No. 1:15-cv-00121-RGA; Includes documents on Mar. 8, 2016 made publically available Jun. 6, 2016; Docket Nos. 78; (60 pages).
Documents filed with District Court Proceedings for *Adtran Inc. v. TQ Delta, LLC* ; U.S. District Court, for the District of Delaware (Wilmington); Civil Action No. 1:15-cv-000121-RGA; Includes documents filed from Jun. 7, 2016-Jun. 8, 2016; Docket Nos. 83-85; (73 pages).
Documents filed with District Court Proceedings for *Adtran Inc. v. TQ Delta, LLC* ; U.S. District Court, for the District of Delaware (Wilmington); Civil Action No. 1:15-cv-00121-RGA; Includes documents filed from Jun. 15, 2016; Docket Nos. 86; (2 pages).
Documents filed with District Court Proceedings for *TQ Delta, LLC v. Comcast Cable Communications LLC*; U.S. District Court, for the District of Delaware (Wilmington); Civil Action No. 1:15-cv-00611-RGA; Includes documents filed from Jun. 10, 2016-Jun. 17, 2016—Docket Nos. 83-94; (180 pages).
Documents filed with District Court Proceedings for *TQ Delta, LLC v. Coxcom LLC et al.*; U.S. District Court, for the District of Delaware (Wilmington); Civil Action No. 1:15-cv-00612-RGA; Includes documents filed from Jun. 6, 2016-Jun. 17, 2016; Docket Nos. 74-92; (182 pages).
Documents filed with District Court Proceedings for *TQ Delta, LLC v. Directv LLC*; U.S. District Court, for the District of Delaware (Wilmington); Civil Action No. 1:15-cv-00613-RGA; Includes documents filed from Jun. 9, 2016-Jun. 17, 2016; Docket Nos. 85-102; (186 pages).
Documents filed with District Court Proceedings for *TQ Delta, LLC v. Dish Network Corporation et al.*; U.S. District Court, for the District of Delaware (Wilmington); Civil Action No. 1:15-cv-00614-RGA; Includes documents filed from Jun. 2, 2016-Jun. 10, 2016; Docket Nos. 83-93; (23 pages).
Documents filed with District Court Proceedings for *TQ Delta, LLC v. Dish Network Corporation et al.*; U.S. District Court, for the District of Delaware (Wilmington); Civil Action No. 1:15-cv-00614-RGA; Includes documents filed from Jun. 15, 2016-Jun. 17, 2016; Docket Nos. 95-104; (178 pages).
Documents filed with District Court Proceedings for *TQ Delta, LLC v. Time Warner Cable Inc., et al.*; U.S. District Court, for the District of Delaware (Wilmington); Civil Action No. 1:15-cv-00615-RGA; Includes documents filed from Jun. 6, 2016-Jun. 17, 2016; Docket Nos. 73-91; (182 pages).
Documents filed with District Court Proceedings for *TQ Delta, LLC v. Verizion Services Corp*; U.S. District Court, for the District of Delaware (Wilmington); Civil Action No. 1:15-cv-00616-RGA; Includes documents filed on Apr. 13, 2016 and from Jun. 6, 2016-Jun. 17, 2016; Docket Nos. 76-95; (61 pages).
Petition for Inter Partes Review of U.S. Pat. No. 8,611,404, including Exhibits 1001-1018, Case No. IPR2016-01160, filed Jun. 6, 2016 (816 pages).
Notice of Filing Date Accorded to Petition and Time for Filing Patent Owner Preliminary Response for *Arris Group, Inc. v. TQ*

(56) References Cited

OTHER PUBLICATIONS

*Delta, LLC*, United States Patent and Trademark Office—Before the Patent Trial and Appeal Board, Case No. IPR 2016-01160 filed Jun. 15, 2016 (5 pages).
Documents filed with District Court Proceedings for *TQ Delta, LLC v. Zhone Technologies Inc.*; U.S. District Court, for the District of Delaware (Wilmington); Civil Action No. 1:13-cv-01836-RGA; Includes documents filed on Jun. 27, 2016; Docket Nos. 216; (2 pages).
Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed on Jun. 27, 2016; Docket Nos. 235; (2 pages).
Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed on Jun. 27, 2016; Docket Nos. 82; (2 pages).
Documents filed with District Court Proceedings for *Adtran Inc. v. TQ Delta, LLC*; U.S. District Court, for the District of Delaware (Wilmington); Civil Action No. 1:15-cv-00121-RGA; Includes documents filed on Jun. 27, 2016; Docket Nos. 87; (2 pages).
Documents filed with District Court Proceedings for *TQ Delta, LLC v. Comcast Cable Communications LLC*; U.S. District Court, for the District of Delaware (Wilmington); Civil Action No. 1:15-cv-00611-RGA; Includes documents filed from Jun. 24, 2016-Jul. 25, 2016; Docket Nos. 95-108; (299 pages).
Documents filed with District Court Proceedings for *TQ Delta, LLC v. Coxcom LLC et al.*; U.S. District Court, for the District of Delaware (Wilmington); Civil Action No. 1:15-cv-00612-RGA; Includes documents filed from Jun. 24, 2016-Jul. 25, 2016; Docket Nos. 93-106; (299 pages).
Documents filed with District Court Proceedings for *TQ Delta, LLC v. Directv LLC*; U.S. District Court, for the District of Delaware (Wilmington); Civil Action No. 1:15-cv-00613-RGA; Includes documents filed from Jun. 24, 2016-Jul. 25, 2016; Docket Nos. 103-116; (299 pages).
Documents filed with District Court Proceedings for *TQ Delta, LLC v. Dish Network Corporation et al.*; U.S. District Court, for the District of Delaware (Wilmington); Civil Action No. 1:15-cv-00614-RGA; Includes documents filed from Jun. 24, 2016-Jun. 15, 2016; Docket Nos. 105-114; (217 pages).
Documents filed with District Court Proceedings for *TQ Delta, LLC v. Time Warner Cable Inc., et al.*; U.S. District Court, for the District of Delaware (Wilmington); Civil Action No. 1:15-cv-00615-RGA; Includes documents filed from Jun. 24, 2016-Jul. 25, 2016; Docket Nos. 92-106; (302 pages).
Documents filed with District Court Proceedings for *TQ Delta, LLC v. Verizon Services Corp*; U.S. District Court, for the District of Delaware (Wilmington); Civil Action No. 1:15-cv-00616-RGA; Includes documents filed from Jun. 24, 2016-Jul. 25, 2016; Docket Nos. 96-110; (298 pages).
Patent Owner's Mandatory Notices for *Arris Group, Inc. v. TQ Delta, LLC*, United Staes Patet and Trademark Office—Before the Patent Trial and Appeal Board, Case No. IPR 2016-01160 filed Jun. 27, 2016 (9 pages).
Petition for Inter Partes Review of U.S. Pat. No. 8,611,404, including Exhibits 1001-1009, Case No. IPR2016-01466, filed Jul. 20, 2016 (999 pages).
Petition for Inter Partes Review of U.S. Pat. No. 9,094,268, including Exhibits 1001-1054, Case No. IPR2016-01469, filed Jul. 21, 2016 (3619 pages).
Petitioner's Notice of Personal Service of Petition and Related Documents to Patent Owner for *Dish Network L.L.C. v. TQ Delta, LLC*, United States Patent and Trademark Office—Before the Patent Trial and Appeal Board, Case No. IPR 2016-01469 filed Jul. 22, 2016 (3 pages).
Petition for Inter Partes Review of U.S. Pat. No. 8,611,404, including Exhibits 1001-1053, Case No. IPR2016-01470, filed Jul. 21, 2016 (3610 pages).
Petitioner's Notice of Personal Service of Petition and Related Documents to Patent Owner for *Dish Network L.L.C. v. TQ Delta, LLC*, United States Patent and Trademark Office—Before the Patent Trial and Appeal Board, Case No. IPR 2016-01470 filed Jul. 22, 2016 (3 pages).
Documents filed with District Court Proceedings for *TQ Delta, LLC v. Zhone Technologies Inc.*; U.S. District Court, for the District of Delaware (Wilmington); Civil Action No. 1:13-cv-01836-RGA; Includes documents filed from Aug. 2, 2016-Aug. 23, 2016; Docket Nos. 217-219; (9 pages).
Documents filed with District Court Proceedings for *TQ Delta, LLC v. Zhone Technologies Inc.*; U.S. District Court, for the District of Delaware (Wilmington); Civil Action No. 1:13-cv-01836-RGA; Includes documents filed from Sep. 16, 2016; Docket Nos. 220; (2 pages).
Documents filed with District Court Proceedings for *TQ Delta, LLC v. Zhone Technologies Inc.*; U.S. District Court, for the District of Delaware (Wilmington); Civil Action No. 1:13-cv-01836-RGA; Includes documents filed on Sep. 26, 2016; Docket Nos. 221-222; (19 pages).
Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed from Aug. 2, 2016-Sep. 1, 2016; Docket Nos. 236-239; (11 pages).
Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed on Sep. 26, 2016; Docket Nos. 240-241; (19 pages).
Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from Aug. 2, 2016-Sep. 1, 2016; Docket Nos. 83-86; (11 pages).
Documents filed with District Court Proceedings for *Adtran Inc. v. TQ Delta, LLC*; U.S. District Court, for the District of Delaware (Wilmington); Civil Action No. 1:15-cv-00121-RGA; Includes documents filed from Aug. 2-Sep. 1, 2016; Docket Nos. 88-91; (11 pages).
Documents filed with District Court Proceedings for *TQ Delta, LLC v. Comcast Cable Communications LLC*; U.S. District Court, for the District of Delaware (Wilmington); Civil Action No. 1:15-cv-00611-RGA; Includes Transcript made available Aug. 1, 2016; Docket No. 62; (63 pages).
Documents filed with District Court Proceedings for *TQ Delta, LLC v. Comcast Cable Communications LLC*; U.S. District Court, for the District of Delaware (Wilmington); Civil Action No. 1:15-cv-00611-RGA; Includes Transcript made available Sep. 13, 2016—Docket No. 86; (26 pages).
Documents filed with District Court Proceedings for *TQ Delta, LLC v. Comcast Cable Communications LLC*; U.S. District Court, for the District of Delaware (Wilmington); Civil Action No. 1:15-cv-00611-RGA; Includes Transcript made available Sep. 13, 2016—Docket No. 87; (72 pages).
Documents filed with District Court Proceedings for *TQ Delta, LLC v. Comcast Cable Communications LLC*; U.S. District Court, for the District of Delaware (Wilmington); Civil Action No. 1:15-cv-00611-RGA; Includes documents filed from Aug. 4-Sep. 13, 2016; Docket Nos. 109-133; (390 pages).
Documents filed with District Court Proceedings for *TQ Delta, LLC v. Comcast Cable Communications LLC*; U.S. District Court, for the District of Delaware (Wilmington); Civil Action No. 1:15-cv-00611-RGA; Includes documents filed from Sep. 16, 2016—Docket Nos. 134-135; (2 pages).
Documents filed with District Court Proceedings for *TQ Delta, LLC v. Comcast Cable Communications LLC*; U.S. District Court, for the District of Delaware (Wilmington); Civil Action No. 1:15-cv-00611-RGA; Includes documents filed from Sep. 20-Oct. 10, 2016—Docket Nos. 136-156; (1476 pages).
Documents filed with District Court Proceedings for *TQ Delta, LLC v. Coxcom LLC et al.*; U.S. District Court, for the District of

(56) References Cited

OTHER PUBLICATIONS

Delaware (Wilmington); Civil Action No. 1:15-cv-00612-RGA; Includes Transcript made available Aug. 1, 2016; Docket No. 61; (63 pages).
Documents filed with District Court Proceedings for *TQ Delta, LLC v. Coxcom LLC et al.*; U.S. District Court, for the District of Delaware (Wilmington); Civil Action No. 1:15-cv-00612-RGA; Includes Transcript made available Sep. 13, 2016; Docket No. 84; (26 pages).
Documents filed with District Court Proceedings for *TQ Delta, LLC v. Coxcom LLC et al.*; U.S. District Court, for the District of Delaware (Wilmington); Civil Action No. 1:15-cv-00612-RGA; Includes Transcript made available Sep. 13, 2016; Docket No. 85; (72 pages).
Documents filed with District Court Proceedings for *TQ Delta, LLC v. Coxcom LLC et al.*; U.S. District Court, for the District of Delaware (Wilmington); Civil Action No. 1:15-cv-00612-RGA; Includes documents filed from Aug. 4-Sep. 13, 2016; Docket Nos. 107-130; (387 pages).
Documents filed with District Court Proceedings for *TQ Delta, LLC v. Coxcom LLC et al.*; U.S. District Court, for the District of Delaware (Wilmington); Civil Action No. 1:15-cv-00612-RGA; Includes documents filed from Sep. 16, 2016; Docket Nos. 131-132; (2 pages).
Documents filed with District Court Proceedings for *TQ Delta, LLC v. Coxcom LLC et al.*; U.S. District Court, for the District of Delaware (Wilmington); Civil Action No. 1:15-cv-00612-RGA; Includes documents filed from Sep. 20-Oct. 10, 2016; Docket Nos. 133-150; (1476 pages).
Documents filed with District Court Proceedings for *TQ Delta, LLC v. Directv LLC*; U.S. District Court, for the District of Delaware (Wilmington); Civil Action No. 1:15-cv-00613-RGA; Includes Transcript made available Aug. 1, 2016; Docket No. 68; (63 pages).
Documents filed with District Court Proceedings for *TQ Delta, LLC v. Directv LLC*; U.S. District Court, for the District of Delaware (Wilmington); Civil Action No. 1:15-cv-00613-RGA; Includes Transcript made available Sep. 13, 2016; Docket No. 93; (26 pages).
Documents filed with District Court Proceedings for *TQ Delta, LLC v. Directv LLC*; U.S. District Court, for the District of Delaware (Wilmington); Civil Action No. 1:15-cv-00613-RGA; Includes Transcript made available Sep. 13, 2016; Docket No. 94; (72 pages).
Documents filed with District Court Proceedings for *TQ Delta, LLC v. Directv LLC*; U.S. District Court, for the District of Delaware (Wilmington); Civil Action No. 1:15-cv-00613-RGA; Includes documents filed from Aug. 4, 2016-Sep. 9, 2016; Docket Nos. 117-137; (385 pages).
Documents filed with District Court Proceedings for *TQ Delta, LLC v. Directv LLC*; U.S. District Court, for the District of Delaware (Wilmington); Civil Action No. 1:15-cv-00613-RGA; Includes documents filed from Sep. 20, 2016-Oct. 10, 2016; Docket Nos. 138-15; (1345 pages).
Documents filed with District Court Proceedings for *TQ Delta, LLC v. Dish Network Corporation et al.*; U.S. District Court, for the District of Delaware (Wilmington); Civil Action No. 1:15-cv-00614-RGA; Includes Transcript made available Aug. 1, 2016; Docket No. 67; (63 pages).
Documents filed with District Court Proceedings for *TQ Delta, LLC v. Dish Network Corporation et al.*; U.S. District Court, for the District of Delaware (Wilmington); Civil Action No. 1:15-cv-00614-RGA; Includes Transcript made available Sep. 13, 2016; Docket No. 96; (26 pages).
Documents filed with District Court Proceedings for *TQ Delta, LLC v. Dish Network Corporation et al.*; U.S. District Court, for the District of Delaware (Wilmington); Civil Action No. 1:15-cv-00614-RGA; Includes Transcript made available Sep. 13, 2016; Docket No. 97; (72 pages).
Documents filed with District Court Proceedings for *TQ Delta, LLC v. Dish Network Corporation et al.*; U.S. District Court, for the District of Delaware (Wilmington); Civil Action No. 1:15-cv-00614-RGA; Includes documents filed from Aug. 10, 2016-Sep. 9, 2016; Docket Nos. 115-131; (195 pages).
Documents filed with District Court Proceedings for *TQ Delta, LLC v. Dish Network Corporation et al.*; U.S. District Court, for the District of Delaware (Wilmington); Civil Action No. 1:15-cv-00614-RGA; Includes documents filed from Sep. 21, 2016-Oct. 10, 2016; Docket Nos. 132-142; (1304 pages).
Documents filed with District Court Proceedings for *TQ Delta, LLC v. Time Warner Cable Inc., et al.*; U.S. District Court, for the District of Delaware (Wilmington); Civil Action No. 1:15-cv-00615-RGA; Includes Transcript made available Aug. 1, 2016; Docket No. 59; (63 pages).
Documents filed with District Court Proceedings for *TQ Delta, LLC v. Time Warner Cable Inc., et al.*; U.S. District Court, for the District of Delaware (Wilmington); Civil Action No. 1:15-cv-00615-RGA; Includes Transcript made available Sep. 13, 2016; Docket No. 83; (26 pages).
Documents filed with District Court Proceedings for *TQ Delta, LLC v. Time Warner Cable Inc., et al.*; U.S. District Court, for the District of Delaware (Wilmington); Civil Action No. 1:15-cv-00615-RGA; Includes Transcript made available Sep. 13, 2016; Docket No. 84; (72 pages).
Documents filed with District Court Proceedings for *TQ Delta, LLC v. Time Warner Cable Inc., et al.*; U.S. District Court, for the District of Delaware (Wilmington); Civil Action No. 1:15-cv-00615-RGA; Includes documents filed from Aug. 4, 2016-Sep. 13, 2016; Docket Nos. 107-129; (383 pages).
Documents filed with District Court Proceedings for *TQ Delta, LLC v. Time Warner Cable Inc., et al.*; U.S. District Court, for the District of Delaware (Wilmington); Civil Action No. 1:15-cv-00615-RGA; Includes documents filed from Sep. 16, 2016; Docket Nos. 130-131; (2 pages).
Documents filed with District Court Proceedings for *TQ Delta, LLC v. Time Warner Cable Inc., et al.*; U.S. District Court, for the District of Delaware (Wilmington); Civil Action No. 1:15-cv-00615-RGA; Includes documents filed from Sep. 20-Oct. 13, 2016; Docket Nos. 132-151; (1520 pages).
Documents filed with District Court Proceedings for *TQ Delta, LLC v. Verizon Services Corp*; U.S. District Court, for the District of Delaware (Wilmington); Civil Action No. 1:15-cv-00616-RGA; Includes Transcript made available Aug. 1, 2016; Docket No. 63; (63 pages).
Documents filed with District Court Proceedings for *TQ Delta, LLC v. Verizon Services Corp*; U.S. District Court, for the District of Delaware (Wilmington); Civil Action No. 1:15-cv-00616-RGA; Includes Transcript made available Sep. 13, 2016; Docket No. 87; (26 pages).
Documents filed with District Court Proceedings for *TQ Delta, LLC v. Verizon Services Corp*; U.S. District Court, for the District of Delaware (Wilmington); Civil Action No. 1:15-cv-00616-RGA; Includes Transcript made available Sep. 13, 2016; Docket No. 88; (72 pages).
Documents filed with District Court Proceedings for *TQ Delta, LLC v. Verizon Services Corp*; U.S. District Court, for the District of Delaware (Wilmington); Civil Action No. 1:15-cv-00616-RGA; Includes documents filed from Aug. 4, 2016-Sep. 14, 2016; Docket Nos. 111-134; (386 pages).
Documents filed with District Court Proceedings for *TQ Delta, LLC v. Verizon Services Corp*; U.S. District Court, for the District of Delaware (Wilmington); Civil Action No. 1:15-cv-00616-RGA; Includes documents filed from Sep. 16, 2016; Docket Nos. 135-136; (2 pages).
Documents filed with District Court Proceedings for *TQ Delta, LLC v. Verizon Services Corp*; U.S. District Court, for the District of Delaware (Wilmington); Civil Action No. 1:15-cv-00616-RGA; Includes documents filed from Sep. 20-Oct. 13, 2016; Docket Nos. 137-156; (1520 pages).
Patent Owner's Preliminary Response for *Arris Group, Inc. v. TQ Delta, LLC*, United States Patent and Trademark Office—Before the Patent Trial and Appeal Board, Case No. IPR 2016-01160 filed Sep. 15, 2016 (67 pages).
Patent Owner's Mandatory Notices Pursuant to 37 C.F.R. § 42.8(a)(2) for *Cisco Systems, Inc. v. TQ Delta, LLC*, United States

(56) References Cited

OTHER PUBLICATIONS

Patent and Trademark Office—Before the Patent Trial and Appeal Board, Case No. IPR 2016-01466 (U.S. Pat. No. 8,611,404) filed Aug. 9, 2016 (9 pages).
Notice of Filing Date Accorded to Petition and Time for Filing Patent Owner Preliminary Response for *Cisco Systems, Inc.* v. *TQ Delta, LLC*, United States Patent and Trademark Office—Before the Patent Trial and Appeal Board, Case No. IPR 2016-01466 (U.S. Pat. No. 8,611,404) filed Aug. 10, 2016 (5 pages).
Patent Owner's Mandatory Notices Pursuant to 37 C.F.R. § 42.8(a)(2) for *Dish Network L.L.C.* v. *TQ Delta, LLC*, United States Patent and Trademark Office—Before the Patent Trial and Appeal Board, Case No. IPR 2016-01469 (U.S. Pat. No. 9,094,268) filed Aug. 11, 2016 (9 pages).
Petitioner's Certificate of Service on Patent Owner for Exhibit 1002 (Replacement Exhibit) for *Dish Network L.L.C.* v. *TQ Delta, LLC*, United States Patent and Trademark Office—Before the Patent Trial and Appeal Board, Case No. IPR 2016-01469 (U.S. Pat. No. 9,094,268) filed Aug. 11, 2016 (111 pages).
Notice of Filing Date Accorded to Petition and Time for Filing Patent Owner Preliminary Response for *Dish Network L.L.C.* v. *TQ Delta, LLC*, United States Patent and Trademark Office—Before the Patent Trial and Appeal Board, Case No. IPR 2016-01469 (U.S. Pat. No. 9,094,268) filed Aug. 12, 2016 (5 pages).
Notice of Filing Date Accorded to Petition and Time for Filing Patent Owner Preliminary Response for *Arris Group, Inc.* v. *TQ Delta, LLC*, United States Patent and Trademark Office—Before the Patent Trial and Appeal Board, Case No. IPR 2016-01470 (U.S. Pat. No. 8,611,404) filed Aug. 10, 2016 (5 pages).
Patent Owner's Mandatory Notices Pursuant to 37 C.F.R. § 42.8(a)(2) for *Dish Network L.L.C.* v. *TQ Delta, LLC*, United States Patent and Trademark Office—Before the Patent Trial and Appeal Board, Case No. IPR 2016-01470 (U.S. Appl. No. 8,611,404) filed Aug. 11, 2016 (9 pages).
Petitioner's Certificate of Service on Patent Owner for Exhibit 1002 (Replacement Exhibit) for *Dish Network L.L.C.* v. *TQ Delta, LLC*, United States Patent and Trademark Office—Before the Patent Trial and Appeal Board, Case No. IPR 2016-01470 (U.S. Pat. No. 8,611,404) filed Aug. 11, 2016 (112 pages).
Board's Notice of Correction for *Dish Network L.L.C.* v. *TQ Delta, LLC*, United States Patent and Trademark Office—Before the Patent Trial and Appeal Board, Case No. IPR 2016-01470 (U.S. Pat. No. 8,611,404) filed Aug. 12, 2016 (2 pages).
Petition for Inter Partes Review of U.S. Pat. No. 9,094,268, including Exhibits 1001-1009, Case No. IPR2016-01760, filed Sep. 8, 2016 (771 pages).
Notice of Filing Date Accorded to Petition and Time for Filing Patent Owner Preliminary Response for *Cisco Systems, Inc.* v. *TQ Delta, LLC*, United States Patent and Trademark Office—Before the Patent Trial and Appeal Board, Case No. IPR 2016-01760 (U.S. Pat. No. 9,094,268) filed Sep. 14, 2016 (5 pages).
Patent Owner's Mandatory Notices Pursuant to 37 C.F.R. § 42.8(a)(2) for *Cisco Systems, Inc.* v. *TQ Delta, LLC*, United States Patent and Trademark Office—Before the Patent Trial and Appeal Board, Case No. IPR 2016-01760 (U.S. Pat. No. 9,094,268) filed Sep. 29, 2016 (9 pages).

* cited by examiner

| Subchannel | Bits |
|---|---|
| . | . |
| . | . |
| 50 | 6 |
| 51 | 6 |
| 52 | 7 |
| . | . |
| . | . |

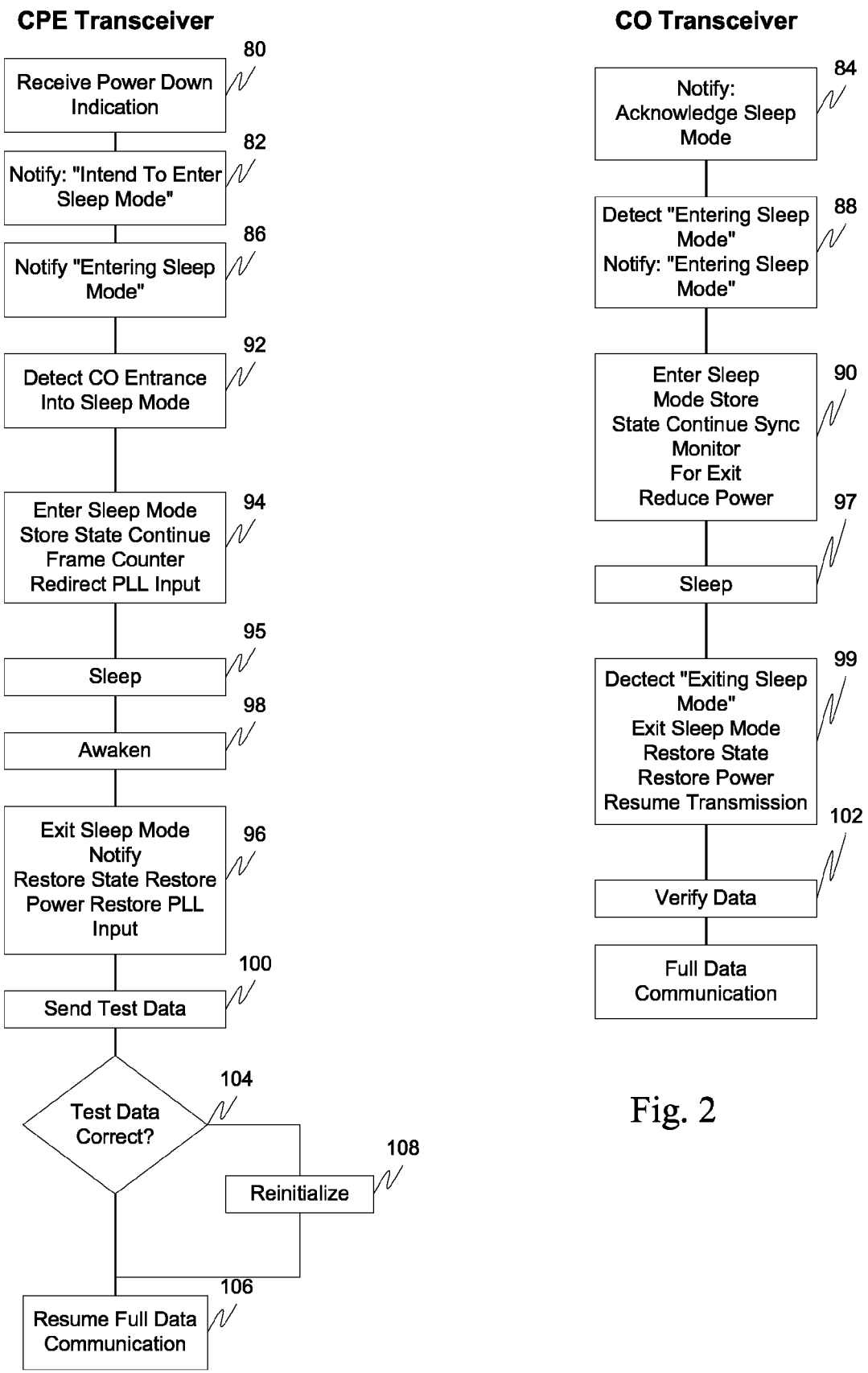

US 9,521,003 B2

MULTICARRIER TRANSMISSION SYSTEM WITH LOW POWER SLEEP MODE AND RAPID-ON CAPABILITY

CROSS-REFERENCE TO RELATED APPLICATIONS

This application is a continuation of U.S. application Ser. No. 14/295,981, filed Jun. 4, 2014, now U.S. Pat. No. 9,094,268, which is a continuation of U.S. application Ser. No. 14/092,248, filed Nov. 27, 2013, now U.S. Pat. No. 8,750,352, which is a continuation of U.S. application Ser. No. 13/887,889, filed May 6, 2013, now U.S. Pat. No. 8,611,404, which is a continuation of U.S. application Ser. No. 13/152,558, filed Jun. 3, 2011, now U.S. Pat. No. 8,437,382, which is a continuation of U.S. application Ser. No. 12/615,946, filed Nov. 10, 2009, now U.S. Pat. No. 7,978,753, which is a continuation of U.S. application Ser. No. 11/425,507, filed Jun. 21, 2006, now U.S. Pat. No. 7,697,598, which is a continuation of U.S. application Ser. No. 11/289,516, filed Nov. 30, 2005, which is a continuation of U.S. application Ser. No. 11/090,183, filed Mar. 28, 2005, which is a continuation of U.S. application Ser. No. 10/778,083, filed Feb. 17, 2004, which is a continuation of U.S. application Ser. No. 10/175,815, filed Jun. 21, 2002, which is a continuation of U.S. application Ser. No. 09/581,400, filed Jun. 13, 2000, now U.S. Pat. No. 6,445,730, which is a 371 of International Application No. PCT/US99/01539, filed Jan. 26, 1999, which claims the benefit of and priority to U.S. Application No. 60/072,447, filed Jan. 26, 1998 entitled "Multicarrier Transmission System with a Low Power Sleep Mode and with Instant-On Capability" each of which are incorporated herein by reference in their entirety.

BACKGROUND OF THE INVENTION

The invention relates to multicarrier transmission systems, and comprises method and apparatus for establishing a power management sleep state in a multicarrier system.

SUMMARY OF THE INVENTION

Multicarrier transmission systems provide high speed data links between communication points. Such systems have recently been introduced for communications over the local subscriber loop that connects a telephone service subscriber to a central telephone office; in this important application they are commonly referred to as "xDSL" systems, where the "x" specifies a particular variant of DSL (digital subscriber loop) communications, e.g., ADSL (asynchronous digital subscriber loop), HDSL (High-Speed Digital Subscriber Loop), etc. These will be referred to generically herein simply as "DSL" systems.

In such systems, a pair of transceivers communicate with other by dividing the overall bandwidth of the channel interconnecting the subscriber and the central office into a large number of separate subchannels, each of limited bandwidth, operating in parallel with each other. For example, one common system divides the subscriber line channel into two hundred and fifty six subchannels, each of 4.3 kilohertz bandwidth. A first group of these (e.g., one hundred ninety six) is allocated to communications from the central office to the subscriber (this is known as the "downstream" direction); a second group (e.g., thirty-two) is allocated to communications from the subscriber to the central office (this is known as the "upstream" direction). The remaining subchannels are allocated to administrative, overhead and control (AOC) functions.

Data to be communicated over the link is divided into groups of bits, one group for each subchannel. The group of bits allocated to a given subchannel is modulated onto a carrier whose frequency is specific to that channel. Typically, quadrature amplitude modulation (QAM) is used for this purpose, and the group of bits is mapped into a vector defined by one of the points of a "constellation" which specifies the allowable data points for transmission over that subchannel at a particular time. Each vector or data point thus comprises a unique symbol representing a specific bit configuration for transmission as a group over its associated subchannel. During the time period allocated for transmission of a symbol (commonly referred to as a "symbol period" or "frame"), each subchannel transmits its symbol in parallel with all other subchannels so that large amounts of data can be transmitted during each frame.

The number of bits carried by a symbol is dependent on the characteristics of the subchannel over which it is to be transmitted. This may vary from one subchannel to another. The principal determinant is the signal-to-noise ratio of the subchannel. Accordingly, this parameter is measured from time to time in order to ascertain its value for each subchannel, and thus determine the number of bits to be transmitted on the particular subchannel at a given time.

The telephone channel is subject to a number of impairments which must be compensated for in order to ensure reliable transmission. Phase (delay) distortion of the transmitted signal is typically the most limiting of these impairments. This distortion is frequency-dependent, and thus components of a signal at different frequencies are shifted by varying amounts, thereby distorting the signal and increasing the likelihood of erroneous detection unless provision is made to combat it. To this end, frequency domain equalizers (FDQ) and time domain equalizers (TDQ) are commonly incorporated into the transmission channel in order to equalize the phase (time) delay across the channel frequency band. Other impairments also exist. For example, frequency-dependent signal attenuation adversely affects signal transmission on the telephone line. This is compensated by the use of gain equalizers on the line, while echo on the line is handled by the use of echo cancellers.

The problem of signal impairment is especially serious in those xDSL configurations which carry the DSL communications on a common line with ordinary voice communications but which omit the use of a "splitter" at either the subscriber premises the central office or both. A "splitter" is basically a filter which separates the low-frequency voice communications (e.g., from zero to four kilohertz) from the higher frequency data communications (which may extend up into the megahertz band) and provides a strong degree of isolation between the two. In the absence of a splitter, unique provisions must be made to accommodate voice and data communications on the same line. For a more detailed description of the problem and its solution, see the co-pending application of Richard Gross et al. entitled "Splitterless Multicarrier Modem", Serial No. PCT/US98 21442, filed Oct. 9, 1998, and assigned to the assignee of the present invention, the disclosure of which is incorporated herein by reference.

Because of their extensive use in Internet communications as well as in other applications, DSL transceivers are commonly maintained in the "on" state, ready to transmit or receive once they have been installed and initialized. Thus, such modems consume a significant amount of power, even when they are not actively transmitting or receiving data. It is generally desirable to limit this power consumption, both for environmental reasons as well as to prolong the life of the equipment. Further, such modems may be implemented or incorporated in part or in whole in computer equipment such as in personal computers for home and business use, and such computers increasingly incorporate power conservation procedures. See, for example, U.S. Pat. No. 5,428, 790, "Computer Power Management System", issued Jun. 27, 1995 on the application of L. D. Harper. Thus, it is desirable to provide an ADSL modem which can accommodate power conservation procedures in equipment with which it is associated, as well as independently of such equipment as may be appropriate.

Because of the complexity of DSL transceivers, and the conditions under which they must operate, it is necessary to initialize them prior to the transmission and reception of data. This initialization includes, inter alia, channel corrections such as "training" the frequency-domain and time-domain equalizers and the echo cancellers; setting the channel gains; negotiating the transmission and reception data rates; adjusting the fine gains on the subchannels over which communication is to take place; setting the coding parameters; and the like. Additionally, it includes measuring the signal-to-noise ratio of each of the subchannels, calculating the bit-allocation tables characteristic of each under given conditions of transmission, and exchanging these tables with other modems with which a given modem communicates. For more detailed discussion of these procedures, refer to the application of Richard Gross et al., cited above and incorporated herein by reference. These procedures can require from seconds to tens of seconds. In a new installation, the time required is inconsequential. However, in an already-operating installation, the time required to initialize or re-initialize the system after a suspension of operation in connection with power conservation is generally unacceptable, since it is typically desired to have the modem respond to request for service nearly instantaneously.

Accordingly, it is an object of the invention to provide a multicarrier transmission system having a low power sleep mode and a rapid-on capability.

Further, it is an object of the invention to provide a multicarrier transmission system for use in digital subscriber line communications that can rapidly switch from a sleep mode to a full-on condition.

Still another object of the invention is to provide a DSL system that can readily be integrated into a computer having a low power sleep mode and which is capable of rapid return to full operation.

BRIEF DESCRIPTION OF THE DRAWINGS

The invention description below refers to the accompanying drawings, of which:

FIG. 2 is a flow diagram of the operation of the present invention; and

DETAILED DESCRIPTION OF AN ILLUSTRATIVE EMBODIMENT

For purposes of explanation, the present invention will be described in the context of an ADSL system having a first transceiver located at the site of a customer's premises (referred to hereinafter as the "CPE transceiver") and a second transceiver located at a local central telephone office (hereinafter referred to as the "CO transceiver"). The two are interconnected for communication by means of a common telephone line over which voice and data are to be transmitted, and the CO transceiver is commonly connected into a broader network such as the Internet to and from which data is to be communicated. The system will be described as using Fourier transform technology for modulation and demodulation of the data to be transmitted. It will be understood, however, that the invention is not limited to this environment, and is applicable to point-to-point communications is other environments, and with other forms of modulation/demodulation. Further, since the CPE transceiver and CO transceiver are very similar, the invention will be explained in connection with a detailed illustration of the CPE transceiver only.

Figure 1:
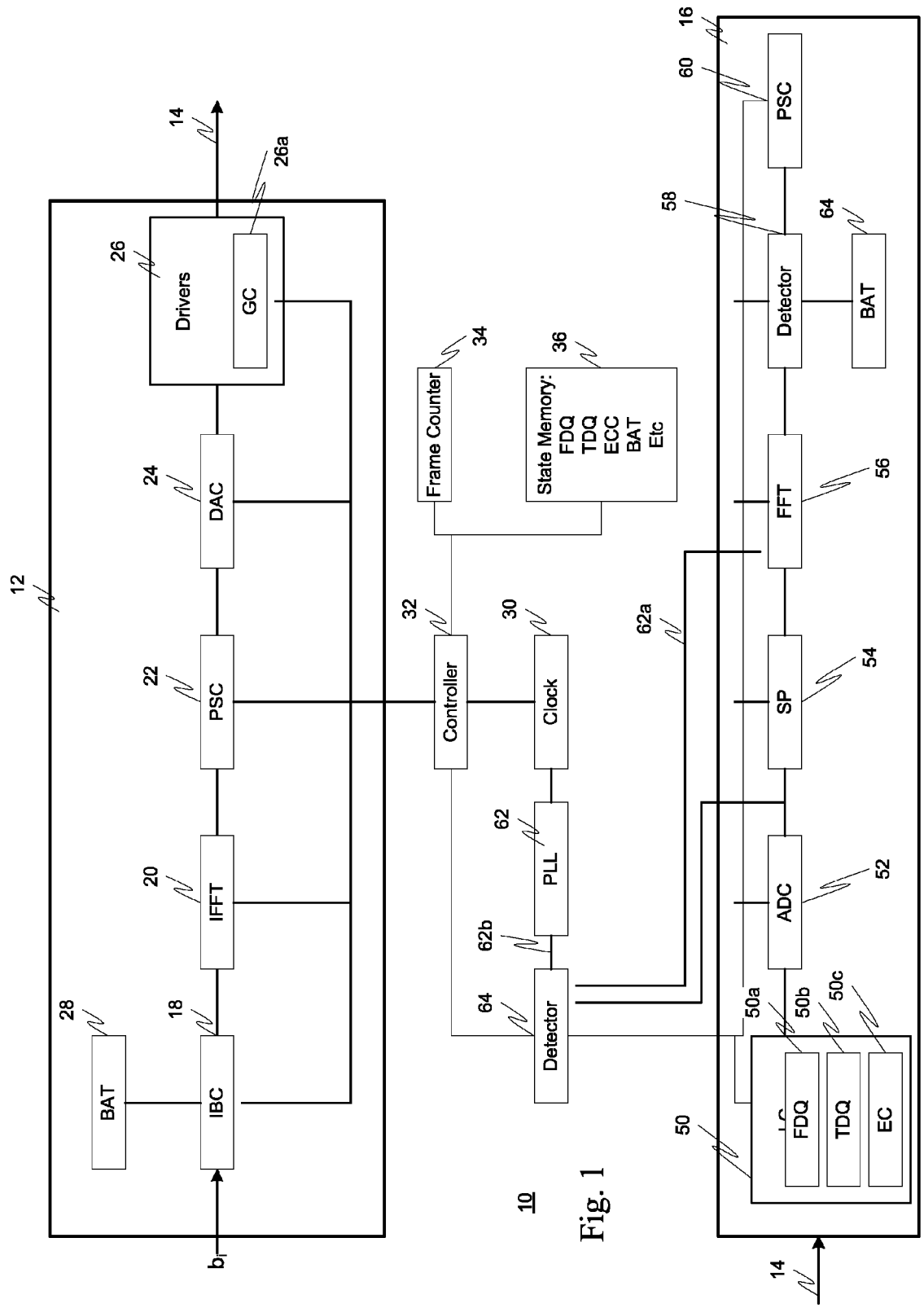
FIG. 1 is a block and line diagram of a multicarrier transmission system in accordance with a preferred embodiment of the present invention.

In FIG. 1, a DSL transceiver 10 in accordance with the present invention has a transmitter section 12 for transmitting data over a digital subscriber line 14 and a receiver section 16 for receiving data from the line. The transmitter section 12 is formed from an input buffer and converter (IBC) 18 that receives a serial string of data (e.g., binary digits) $b_i$ to be transmitted and converts the data into a plurality of pairs of complex-valued symbols $X_i$ and their conjugates $X_{N-i}=X^*_i$, i=0, 1, . . . N. Typically, the buffer 18 holds at least a frame of data (a frame comprising the amount of data to be transmitted during one symbol period). The pairs of symbols $X_i$ and $X^*_i$ are applied to an Inverse Fast Fourier Transform (IFFT) 20 to provide real time output signals $X_j$, j=0, 1, . . . N/2−1. The latter in turn are converted to serial form in a parallel-to-serial convener (PSC) 22 and then applied to a digital-to-analog converter (DAC) 24 for application to a line driver 26. The converter 24 may apply a cyclic prefix to the signals $X_j$ to combat intersymbol interference caused by the transmission medium. The driver 26 may incorporate a gain control section (GC) 26a for controlling the signal amplitude (and thus power) as it is applied to a communication channel such as the digital subscriber line 14.

IFFT 20 may be viewed as a data modulator. The symbols $X_i$, and their conjugates $X_{N-i}$, correspond to data points defining signal vectors in a quadrature amplitude modulation (QAM) constellation set. The converter 18 forms the respective symbols from the input data with the aid of a bit allocation table (BAT) 28 which specifies, for each subchannel, the number of bits to be carried by the symbol transmitted over that subchannel, and thus defines the data point to be associated with the symbol. This table is typically calculated at the transceiver and is transmitted to other transceivers with which the instant transceiver communicates, to thereby enable them to decode the symbols received by them from the instant transceiver.

Figures 1A, 1B:
FIG. 1A is a portion of an exemplary chart showing a possible bit distribution among subchannels.
FIG. 1B illustrates a timing signal used in accordance with the invention.

The number of bits which each symbol carries is determined by the characteristics of the subchannel over which the symbol is to be transmitted, and particularly by the signal-to-noise ratio of the subchannel. Procedures for this calculation are known. FIG. 1A shows an example of such a table as formed and stored at transceiver 10. Thus, the symbol to be transmitted over subchannel 50 may be determined to have an allocation of six bits; that of subchannel 51, six bits; that of subchannel 52, seven bits, etc.

A Clock 30 controls the timing of the operation of the transmitter 12. It supplies input to a Controller 32 which controls the individual units of the transmitter. In the case of the CO transceiver, the clock 30 typically is a master clock to which a remote transceiver, such as at a subscriber premises, will be synchronized. In the case of a transceiver at the subscriber premises, such as is shown here for purposes of illustration, the clock is derived from the master clock at the central office as described more fully below in connection with the receiver portion of the transceiver.

A Frame Counter (FC) 24 connected to the controller 32 maintains a count of the number of frames of data transmitted from or received by the transceiver 10. The clock 30 maintains the count in counter 34 synchronous with that of a corresponding counter (not shown) in the CO transceiver. In DSL systems, typically, data is communicated in the form of a sequence of data frames (e.g., sixty-eight frames for ADSL as specified in ITU Document G.992.2), followed by a synchronization frame, each frame having a duration of one symbol period of approximately two hundred and fifty microseconds. Together, the sixty-nine frames comprise a "superframe". Thus, the counter 34 typically maintains a count modulo sixty-nine. Finally, a State Memory (SM) 36 connected to the controller 32 records the state of the transceiver for reasons discussed more fully below.

Turning now to the receiver section 16, it is formed from a line conditioner (LC) 50; an analog-to-digital converter (ADC) 52; a serial-to-parallel converter 54; a Fast Fourier Transform (FFT) section 56; a decoder 58; and a parallel-to-serial converter 60. The conditioner 50 compensates for transmission distortions introduced by the line 14, and commonly includes a frequency-domain equalizer (FDQ) 50a; a time-domain equalizer (TDQ) 50b; and an echo canceller (EC) 50c, among other elements. The ADC 52 converts the received signal to digital form and applies it to the serial-to-parallel converter 54. The converter 54 removes any cyclic prefix that may have been appended to the signal before it was transmitted, and applies the resultant signal to the FFT 56 which effectively "demodulates" the received signal. The output of the FFT is applied to decoder 58 which, in conjunction with a bit-allocation-table 64, recovers the symbols $X_i$ and $X^*_i$, and the bits associated with them. The output of detector 58 is applied to the parallel-to-serial converter 60 which restores the data stream, $b_i$, that was originally applied to the transmitter. The controller 32 also controls the operation of the receiver portion 16 of the transceiver 10.

During normal (non-sleep mode) operation, a phase-lock loop (PLL) 62 receives from the FFT 56 a timing reference signal 62a (see FIG. 1A) via a line 62b. The timing reference signal 62a is transmitted from the transmitter with which the receiver 16 communicates (e.g., the CO transmitter). This signal is advantageously a pure tone of fixed frequency and phase which is synchronized with the Master Clock in the transmitter; its frequency defines the frame rate of the transceivers. Other forms of timing signal may, of course, be used, but use of a pure tone has the advantage of simplicity and reliability even when portions of the transceiver are powered down in accordance with the invention. The PLL 62 locks itself to this signal and drives clock 30 in synchronism with the Master Clock in the driving transmitter. This also synchronizes frame counter 34 of the CPE transceiver to the corresponding frame counter of the CO transceiver. Control of the receiver section is provided by the controller 32.

In the sleep mode, the FFT 56 is preferably dormant. Accordingly, the timing reference signal for PLL 62 is provided from the output of the analog to digital converter 52 via a detector 64 which extracts the timing signal from the signal appearing on line 14 during sleep mode, by calculating the DFT of the synchronizing pilot tone. Controller 32 controls the switching of the input to PLL 62 between these two sources so that the PLL 62 remains locked to the CO transceiver timing reference.

As noted earlier, the transceiver of the present invention will commonly be incorporated in a computer such as a personal computer; indeed, it may be implemented as an integral part of such a computer, which may have a power conservation capability for activation when the computer is not in active operation. It is thus desirable that the transceiver be able to suspend operations and enter a "sleep" mode in which it consumes reduced power when it is not needed for data transmission or reception, but nonetheless be able to resume transmission or reception almost instantaneously, e.g., within a few frames.

Further, when the ADSL transceiver is implemented as an integral part of a computer, it may often be the case that the processing power of the computer is, at a given moment, devoted to another task such as graphics, word processing, and the like, and is thus unable to service the transceiver. In such circumstances, it is possible that a frame that is assembled for transmission to the CO transceiver, and thence to some network connected to it, is incomplete, and thus would generate errors if transmitted. Accordingly, the transceiver of the present invention is responsive to such conditions by entering an "idle" state in which it ceases active transmission of data while the computer is elsewhere occupied. This state is similar in many ways to the sleep mode state although, of course, its purpose is not power conservation, and thus in the idle state the power to selected portions of the transceiver may, but need not, be reduced. The idle state maintains synchronous signaling between the CPE and CO transceivers but no data is transmitted. On receipt of the idle indicator from the CPE, the CO transceiver transmits idle cells to the network to maintain connection with the network.

Referring now more particularly to FIG. 2, the power down operation of the CPE transceiver begins on receipt of a power down indication (step 80) by the CPE transceiver controller 32. The power down indication may be applied to the controller 32 from an external source such as a personal computer in which the transceiver is included; it may be generated within the transceiver itself as a result of monitoring the input buffer 18 and determining that no data has been applied to it for a given time interval or that the buffer has not been filled despite passage of a symbol time; it may be responsive to a power down command from the CO transceiver; or it may be generated in response to other conditions.

Considering for the moment the first two cases, the CPE transceiver responds to the indication by transmitting to the CO transceiver an "Intend To Enter Sleep Mode" notification (step 82). This notification indicates that the transceiver is about to undergo a change of state, and may take any of a variety of forms; preferably it is a message, but may also comprise a tone, an inverted sync signal, a flag, or even the cessation of data transmission itself. The notification may advantageously be transmitted over one of the embedded operations channels of the system. It provides the CO transceiver an opportunity to prepare itself to enter sleep mode, and also to signal the CPE transceiver if entrance into sleep mode is not appropriate or desirable at the particular moment.

If entrance into sleep mode is permissible at this time; the CO transceiver responds to the power down or idle signal by transmitting an "Acknowledge Sleep Mode" notification (step 84) to the CPE transceiver. This and subsequent notifications described in connection with the sleep or idle mode may similarly take any of a variety of forms such as described above for the "Intend To Enter Sleep Mode" notification, but again preferably is in the form of a message transmitted over an embedded operations channel.

After it has received acknowledgment from the CO transceiver, the CPE transceiver transmits an "Entering Sleep Mode" notification (step 86) to the CO transceiver and ceases transmission, either immediately or after a given number of frames. The CO transceiver detects this notification; transmits its own "Entering Sleep Mode" notification (step 88); and enters sleep mode (step 90). In pursuance of this, the CO transceiver stores its state in its own state memory corresponding to the state memory 36 of CPE transceiver 10. The state of the CO or CPE transceivers preferably includes at least the frequency and time-domain equalizer coefficients (FDQ; TDQ) and the echo-canceller coefficients (ECC) of its receiver portion and the gain of its transmitter portion; the transmission and reception data rates; the transmission and reception coding parameters; the-transmission fine gains; and the Bit Allocation Tables. The CO transceiver continues to advance the frame count and superframe count during the period of power-down in order to ensure synchrony with the remote CPE transceiver when communications are resumed. In order to maintain synchronization during the power down or idle state, the CO transceiver continues to transmit to the CPE transceiver the synchronizing pilot tone 62*a*. It may, at this time, perform its own power reduction. In particular, it may reduce or cut off power to the digital modulator/demodulator portions of its transmitter and receiver sections (corresponding to the IFFT 20 and FFT 56 of the CPE transceiver, FIG. 1); this provides a significant power reduction. Further, it may reduce power to parts of the analog circuitry. Power will be maintained, of course, to at least that portion of the analog driver circuitry which transmits the pilot tone and other control signals to the CPE transceiver, and to line circuits required to monitor the line 14 for signals from the CPE transceiver.

In a central office, the rest of the equipment is still operating, and while the link between the CO transceiver and the CPE transceiver is in a sleep state, user data provided by the CO transceiver will be benign idle data such as ATM IdleCells or HDLC Flag octets, and not generate false data errors to other equipment.

In response to the "Entering Sleep Mode" notification from the CO transceiver, the CPE transceiver enters the sleep mode (step 92). In particular, it stores its state (step 94) in state memory 38; as noted above in connection with the CO transceiver, this includes preferably at least the frequency and time-domain equalizer coefficients (FDQ; TDQ) and the echo-canceller coefficients (ECC) of its receiver and the gain of its transmitter; the transmission and reception data rates; the transmission and reception coding parameters; the transmission fine gains; and the Bit Allocation Tables. The phase and frequency offset of the phase-locked loop 62 is maintained by continued operation of the loop. The CPE transceiver 10 then reduces power to the digital modulator/demodulator circuitry comprising IFFT 20 and FFT 56, as well as to and transmitter data line drivers 26. However, it continues to advance the frame counter 34 in accordance with the received synchronizing signal 62*a*. However, the CPE controller 32 now causes this signal to be applied to the PLL 62 from the output of the ADC 52 (FIG. 1) via the detector 64, which implements the DFT of a single tone, instead of directly from the output of the FFT 56 as was previously the case. This enables the FFT 56 to be powered down. The CPE and CO transceivers then operate in sleep mode (steps 95 and 97, respectively) until they awaken.

During the sleep mode state, the CO transceiver continues to monitor (step 90) the data subscriber line 14 for an "Exiting Sleep Mode" signal from the CPE transceiver (step 96). The CPE transceiver transmits this signal when its controller receives an "Awaken" indication (step 98) from an external source such as a computer in which it is installed or from other sources, or when its controller detects the presence of new data in the input buffer 18. In response to the "Awaken" signal, the CPE transceiver retrieves its stored state from the state memory 38; restores full power to its circuitry; and restores the output of the FFT 56 to the input of the PLL 62 (step 96). The CO transceiver, on detecting the "Exit Sleep Mode" notification from the CPE transceiver (step 99), thereupon exits sleep mode by restoring its state and restoring power. On waking up from sleep mode, the CPE transceiver can begin transmitting immediately or after only a few frames delay, since it need not repeat the initialization that was earlier required to establish the requisite parameters (e.g., frequency and time-domain equalizer coefficients (FDQ; TDQ, echo-canceller coefficients (ECC), transmitter gains; transmission and reception data rates; transmission and reception coding parameters; transmission fine gains; and Bit Allocation Tables) required for reliable communications. The same is true for the CO transceiver.

The present invention enables rapid resumption of transmissions, whether recovering from a power down or from an enforced idle condition due to temporary unavailability of processor resources in the case of an embedded transceiver, i.e., a transceiver implemented largely software and sharing CPU processing power with the other applications which may from time to time divert CPU resources from the transceiver. In particular, the transceiver of the present invention is capable of recovering full data transmission capabilities within a period of a few frames.

On resuming communication, it may be desirable for the CPE transceiver to transmit several frames of test (known) data (step 100) before resuming transmission of user data. This enables the system to verify that system conditions have not changed so significantly as to require renewed initialization. If the CO transceiver receives these without error, it notifies the CPE transceiver (step 102) and the latter resumes full user data transmission (step 104 and 106). Otherwise, reinitialization must be performed (steps 104 and 108) before user data transmission occurs. A similar procedure may be employed for the transmission by the CO transceiver, and need not be described in further detail.

It will be understood that the order of certain of the steps described above may be changed, and that some steps may be omitted or added. For example, instead of initiating sleep mode at the CPE transceiver as shown in FIG. 2, the CO transceiver may initiate sleep mode. In such a case, the flow of notifications will be as shown in FIG. 2, but with the positions of CO and CPE transceivers reversed. Further, in some cases it may be desirable to omit the preparatory notifications of steps 82 and 84 and commence entrance into sleep mode as at steps 86 and 88. This will speed entrance into sleep mode, but is more prone to error.

It should also be understood that it is possible, and in various circumstances may be desirable, to operate in a "partial" sleep mode, in which only part of each transceiver is powered down. For example, where data transfer is one-way (when, for example, receiving video at the CPE transceiver from the CO transceiver without any upstream data being sent in return to the CO), the CO receiver and the CPE transmitter may operate in the sleep mode, while the CO transmitter and the CPE receiver are operating in full power mode.

As noted earlier, it is possible to implement major portions of the CPE and CO transceivers in software. In some applications, a dedicated CPU will be used for this purpose; in others, the CPU will be shared with other applications. Even when the sleep mode power conservation procedures described above are not necessary, when the transceivers are implemented in a shared-CPU environment, it may often be necessary to enter an idle mode that is similar to the sleep mode described above in order to maintain synchronization between the transceivers whenever the CPU is unable to service the transceivers. This is accomplished in accordance with the present invention by providing an Interface Transmission Unit (ITU) between the CPU and the data subscriber line which generates an idle indicator whenever the CPU is unavailable for servicing the transceiver which and transmits it to the remote transceiver to maintain the latter in synchronism with the former.

Figure 3:
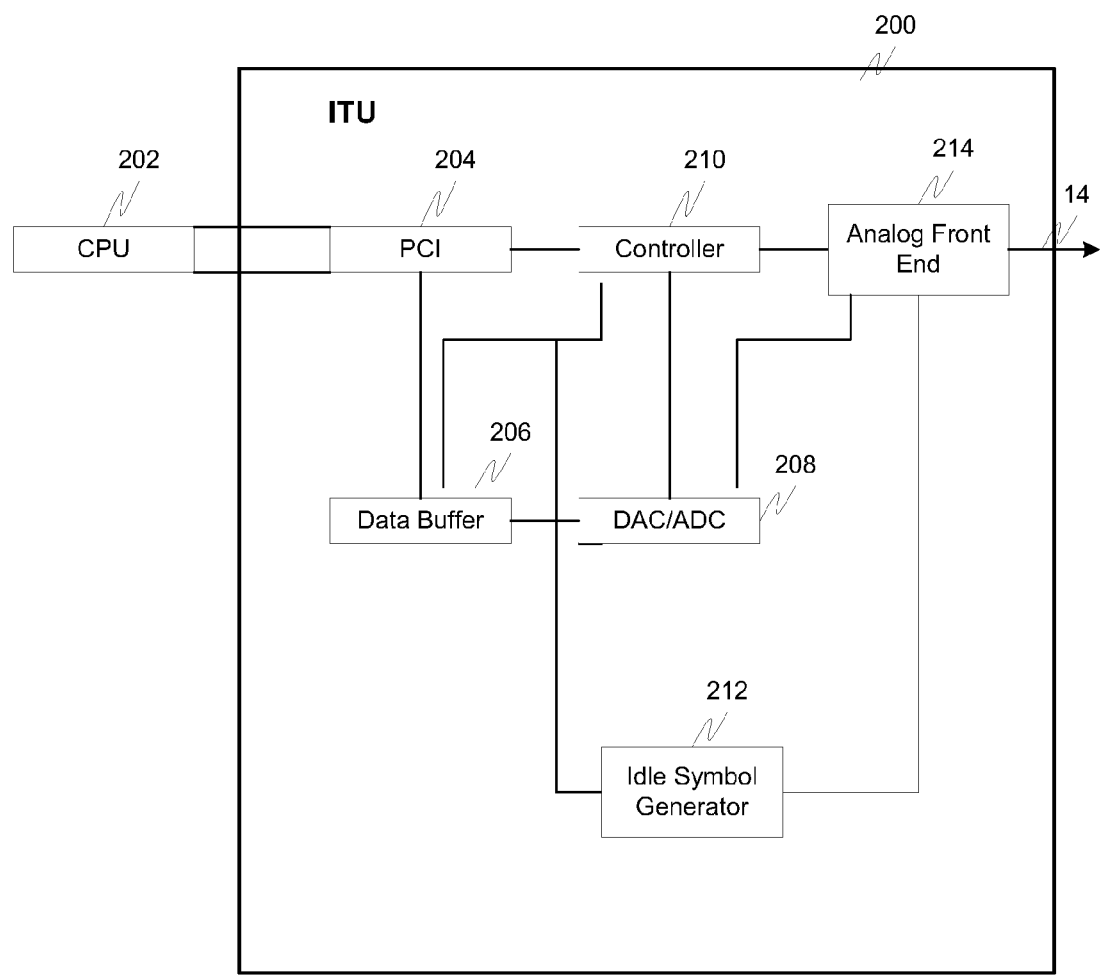
FIG. 3 is a block and line diagram of still another aspect of the present invention.

In particular, referring now to FIG. 3, an Interface Transmission Unit (ITU) 200 in accordance with the present invention is interposed between a CPU 202 and the data subscriber line 14. The unit 200 includes a PCI bus interface 204, a data buffer 206, an analog-to-digital and digital-to-analog converter 208, a controller 210, an idle indicator generator 212, and an analog front end 214.

In normal operation, the CPU passes data and control signals to the ITU 200 via the bus interface unit 204. Data from the CPU that is to be transmitted over the line 14 is stored in the buffer 206 and passed through the digital-to-analog converter portion of unit 208 for application to the line 214 through the analog front end. Conversely, data that is received from the line 14 is passed through the digital-to-analog converter portion of unit 208 to the buffer 206 and thence to the CPU 202 via the interface 204. The CPU processes the data flowing in the different directions in the manner illustrated in connection with FIG. 1, i.e., it performs the requisite IFFT and FFT transforms on the data as appropriate. The idle indicator generator 212 may be inactive in this state.

When the CPU must divert its resources elsewhere for servicing applications having higher priority at the moment, the controller 210 activates the idle indicator generator 212 which generates a synchronous idle indicator symbol for transmission to the other transceiver with which the present transceiver is communicating. For example, the CPU may affirmatively notify the controller 210 that this is about to occur. Alternatively, the controller may monitor the buffer 206 and note its filling with data by the CPU has been interrupted for some time period. The idle indicator symbol is preferably of the same duration as a data frame, so that the remote transceiver can process it in the normal manner. However, it must be distinct from any valid data frame so that it can be detected and distinguished without ambiguity. It may comprise a tone, a collection of tones, a collection of tones modulated by bits, with similar of different phases, an inverted sync signal, or even the absence of signal. The CO transceiver responds to receipt of the idle symbol by itself transmitting idling data to the network or other devices with which it is connected so that erroneous data will not be transmitted. When the CPU returns to servicing its associated transceiver, the idle generator 212 suspends operation, preferably on command of the controller 210.

Even when the transceiver is not implemented as part of the shared resources of a CPU, it may nonetheless be beneficial to transmit an idle signal as described above when the transceiver is in sleep mode. This minimizes the likelihood that erroneous data may be emitted, for example, to a network by a CO transceiver when a CPE transceiver with which it is communicating is in sleep mode.

From the foregoing, it 'will be seen that we have provided a multitone transceiver system that capable of operating wholly or partially in a sleep mode, both for purposes of power conservation as well as to accommodate itself to integration with, or incorporation into, computer systems having a power conservation mode. The transceiver system also is adapted to implementation in software under circumstances where the CPU on which the software runs is shared with other applications which may sometimes preempt resources needed for the transceiver.

The invention claimed is:

1. A multicarrier transceiver operable to:
   transmit or receive a message to enter a low power mode; and
   enter the low power mode, wherein a transmitter portion of the transceiver is operable to not transmit data during the low power mode and a receiver portion of the transceiver is operable to receive data during the low power mode, wherein the transceiver is a device that is operable to transmit or receive internet and video data.

2. The transceiver of claim 1, further operable to receive a signal for synchronization during the low power mode.

3. The multicarrier transceiver of claim 1, further comprising one or more connected elements including a controller, clock, analog to digital converter, digital to analog converter, a detector, memory, an analog front end, an idle symbol generator, a converter, an FFT and an IFFT.

4. A multicarrier transceiver operable to:
   transmit or receive a message to enter a low power mode;
   enter the low power mode, wherein a transmitter portion of the transceiver is operable to not transmit data during the low power mode and a receiver portion of the transceiver is operable to receive data during the low power mode; and
   store, during the low power mode, at least one parameter associated with a full power mode.

5. The transceiver of claim 4, further operable to receive a signal for synchronization during the low power mode.

6. The multicarrier transceiver of claim 4 further comprising one or more connected elements including a controller, clock, analog to digital converter, digital to analog converter, a detector, memory, an analog front end, an idle symbol generator, a converter, an FFT and an IFFT.

7. A multicarrier transceiver operable to:
   transmit or receive a message to enter a low power mode; and
   enter the low power mode, wherein a receiver portion of the transceiver is operable to not receive data during the low power mode and a transmitter portion of the transceiver is operable to transmit data during the low power mode, wherein the transceiver is a device that is operable to transmit or receive internet and video data.

8. The transceiver of claim 7, further operable to receive a signal for synchronization during the low power mode.

9. The multicarrier transceiver of claim 7, further comprising one or more connected elements including a controller, clock, analog to digital converter, digital to analog converter, a detector, memory, an analog front end, an idle symbol generator, a converter, an FFT and an IFFT.

10. A multicarrier transceiver operable to:
transmit or receive a message to enter a low power mode;
enter the low power mode, wherein a receiver portion of the transceiver is operable to not receive data during the low power mode and a transmitter portion of the transceiver is operable to transmit data during the low power mode; and
store, during the low power mode, at least one parameter associated with a full power mode.

11. The transceiver of claim 10, further operable to receive a signal for synchronization during the low power mode.

12. A multicarrier transceiver of claim 10, further comprising one or more connected elements including a controller, clock, analog to digital converter, digital to analog converter, a detector, memory, an analog front end, an idle symbol generator, a converter, an FFT and an IFFT.

13. A method, in a multicarrier transceiver, comprising:
transmitting or receiving, during a full power mode, a multicarrier signal that comprises a cyclic prefix;
transmitting or receiving a message to enter a low power mode; and
entering the low power mode, wherein a transmitter portion of the transceiver does not transmit data during the low power mode and a receiver portion of the transceiver receives data during the low power mode.

14. The method of claim 13, further comprising receiving a signal for synchronization during the low power mode.

15. A multicarrier transceiver operable to:
transmit or receive, during a full power mode, a multicarrier signal that comprises a cyclic prefix;
transmit or receive a message to enter a low power mode; and
enter the low power mode, wherein a transmitter portion of the transceiver is operable to not transmit data during the low power mode and a receiver portion of the transceiver is operable to receive data during the low power mode.

16. The transceiver of claim 15, further operable to receive a signal for synchronization during the low power mode.

17. A method, in a multicarrier transceiver, comprising:
transmitting or receiving, during a full power mode, a multicarrier signal that comprises a cyclic prefix;
transmitting or receiving a message to enter a low power mode; and
entering the low power mode, wherein a receiver portion of the transceiver does not receive data during the low power mode and a transmitter portion of the transceiver transmits data during the low power mode.

18. The method of claim 17, further comprising receiving a signal for synchronization during the low power mode.

19. A multicarrier transceiver operable to:
transmit or receive, during a full power mode, a multicarrier signal that comprises a cyclic prefix;
transmit or receive a message to enter a low power mode; and
enter the low power mode, wherein a receiver portion of the transceiver is operable to not receive data during the low power mode and a transmitter portion of the transceiver is operable to transmit data during the low power mode.

20. The transceiver of claim 19, further operable to receive a signal for synchronization during the low power mode.

* * * * *